(12) United States Patent
Akselrod et al.

(10) Patent No.: US 11,487,183 B1
(45) Date of Patent: Nov. 1, 2022

(54) TUNABLE OPTICAL DEVICE CONFIGURATIONS AND PACKAGING

(71) Applicant: Lumotive, LLC, Redmond, WA (US)

(72) Inventors: Gleb M. Akselrod, Redmond, WA (US); Erik Edward Josberger, Renton, WA (US); Mark C. Weidman, Redmond, WA (US); Prasad Padmanabha Iyer, Albuquerque, NM (US)

(73) Assignee: Lumotive, LLC, Redmond, WA (US)

( * ) Notice: Subject to any disclaimer, the term of this patent is extended or adjusted under 35 U.S.C. 154(b) by 0 days.

(21) Appl. No.: 17/697,888

(22) Filed: Mar. 17, 2022

(51) Int. Cl.
*G02F 1/29* (2006.01)
*B05D 5/06* (2006.01)
*B05D 3/10* (2006.01)

(52) U.S. Cl.
CPC .............. *G02F 1/292* (2013.01); *B05D 3/107* (2013.01); *B05D 5/063* (2013.01); *G02F 2202/30* (2013.01)

(58) Field of Classification Search
CPC ............................. G02F 1/292; G02F 2202/30
See application file for complete search history.

(56) References Cited

U.S. PATENT DOCUMENTS

| | | |
|---|---|---|
| 6,844,946 B2 | 1/2005 | Buse |
| 9,040,428 B2 | 5/2015 | Hong et al. |
| 9,104,086 B1 | 8/2015 | Davids |
| 9,195,052 B2 | 11/2015 | Long et al. |
| 9,476,981 B2 | 10/2016 | Yaacobi |
| 9,804,329 B2 | 10/2017 | Montazeri et al. |
| 9,935,375 B2 | 4/2018 | Bowers |

(Continued)

FOREIGN PATENT DOCUMENTS

| | | |
|---|---|---|
| CN | 113614570 A | 11/2021 |
| EP | 3942334 A1 | 1/2022 |

(Continued)

OTHER PUBLICATIONS

Arbabi, et al., Dielectric Metasurfaces for Complete Control of Phase and Polarization with Subwavelength Spatial Resolution and High Transmission, arXiv:1411.1494v2 [physics.optics], Sep. 4, 2015, pp. 1-27.

(Continued)

*Primary Examiner* — Jessica M Merlin
(74) *Attorney, Agent, or Firm* — Phillips Winchester; Justin K. Flanagan

(57) ABSTRACT

According to various embodiments, a cover is sealed over a metasurface on a substrate to create a sealed chamber. Liquid crystal, or another tunable refractive index dielectric material, is positioned within the sealed chamber around optical structures of the metasurface before or after the cover is sealed. For example, the liquid crystal may be injected through small vias or holes to fill a sealed chamber. In some embodiments, a glass cover is shaped or patterned with photoresist to protrude into the sealed chamber to reduce the thickness of the liquid crystal used to fill the sealed chamber. A driver to control the metasurface may be, for example, integrated within the substrate, be attached to exposed bond pads of the metasurface, and/or be embodied as a control layer connected to the metasurface through the substrate by through-substrate vias (TSVs).

29 Claims, 27 Drawing Sheets

(56) References Cited

U.S. PATENT DOCUMENTS

| | | |
|---|---|---|
| 9,946,076 B2 | 4/2018 | Smits |
| 10,199,415 B2 | 2/2019 | Akselrod |
| 10,254,448 B2 | 4/2019 | Lee |
| 10,303,038 B2 | 5/2019 | Kim et al. |
| 10,332,923 B2 | 6/2019 | Josberger |
| 10,451,800 B2 | 10/2019 | Akselrod |
| 10,468,447 B2 | 11/2019 | Akselrod et al. |
| 10,627,571 B1 | 4/2020 | Akselrod |
| 10,665,953 B1 | 5/2020 | Akselrod et al. |
| 10,670,782 B2 | 6/2020 | Arbabi et al. |
| 10,720,712 B2 | 7/2020 | Foo |
| 10,816,939 B1 | 10/2020 | Coleman |
| 11,005,186 B2 | 5/2021 | Akselrod et al. |
| 11,092,675 B2 | 8/2021 | Akselrod et al. |
| 2002/0081445 A1 | 6/2002 | Kadomura et al. |
| 2003/0174940 A1 | 9/2003 | Charlton et al. |
| 2004/0037497 A1 | 2/2004 | Lee |
| 2004/0125266 A1 | 7/2004 | Miyauchi et al. |
| 2005/0117866 A1 | 6/2005 | Park et al. |
| 2006/0202125 A1 | 9/2006 | Suhami |
| 2006/0239688 A1 | 10/2006 | Hillis et al. |
| 2006/0284187 A1 | 12/2006 | Wierer, Jr. et al. |
| 2007/0013983 A1 | 1/2007 | Kitamura et al. |
| 2007/0121210 A1* | 5/2007 | Sato .................. G02F 1/133371 359/569 |
| 2009/0067774 A1 | 3/2009 | Magnusson |
| 2010/0156573 A1 | 6/2010 | Smith |
| 2011/0134496 A1 | 6/2011 | Tompkin et al. |
| 2011/0244613 A1 | 10/2011 | Heck et al. |
| 2012/0194399 A1 | 8/2012 | Bily et al. |
| 2012/0267694 A1 | 10/2012 | Kaiser et al. |
| 2013/0129293 A1 | 5/2013 | Ogawa et al. |
| 2013/0286633 A1 | 10/2013 | Rodriguez |
| 2014/0038320 A1 | 2/2014 | Wang |
| 2014/0085693 A1 | 3/2014 | Mosallaei et al. |
| 2014/0266946 A1 | 9/2014 | Bily et al. |
| 2014/0294338 A1 | 10/2014 | Long |
| 2015/0036198 A1 | 2/2015 | Inokuchi |
| 2015/0162658 A1 | 6/2015 | Bowers et al. |
| 2015/0318618 A1 | 11/2015 | Chen et al. |
| 2015/0318620 A1 | 11/2015 | Black et al. |
| 2015/0372389 A1 | 12/2015 | Chen et al. |
| 2015/0380828 A1 | 12/2015 | Black et al. |
| 2017/0030773 A1 | 2/2017 | Han et al. |
| 2017/0153528 A1 | 6/2017 | Kim et al. |
| 2017/0199425 A1* | 7/2017 | Nam .................. G02F 1/1337 |
| 2017/0212285 A1 | 7/2017 | Arbabi |
| 2018/0047774 A1 | 2/2018 | Garreau et al. |
| 2018/0076521 A1 | 3/2018 | Mehdipour et al. |
| 2018/0138576 A1 | 5/2018 | Cohen |
| 2018/0239021 A1 | 8/2018 | Akselrod |
| 2018/0239213 A1 | 8/2018 | Akselrod |
| 2018/0241131 A1 | 8/2018 | Akselrod |
| 2018/0248267 A1 | 8/2018 | Akselrod |
| 2019/0006533 A1 | 1/2019 | Goldan et al. |
| 2019/0243208 A1 | 8/2019 | Peng et al. |
| 2019/0252441 A1 | 8/2019 | Akselrod |
| 2019/0260124 A1 | 8/2019 | Davoyan |
| 2019/0285798 A1 | 9/2019 | Akselrod |
| 2019/0294104 A1 | 9/2019 | Rho et al. |
| 2019/0377084 A1 | 12/2019 | Sieasman et al. |
| 2020/0303826 A1 | 9/2020 | Akselrod et al. |
| 2020/0303827 A1 | 9/2020 | Akselrod et al. |
| 2021/0141060 A1 | 5/2021 | Akselrod et al. |
| 2021/0333648 A1* | 10/2021 | Lu .................. H01Q 15/0086 |
| 2022/0043117 A1 | 2/2022 | Akselrod et al. |

FOREIGN PATENT DOCUMENTS

| | | |
|---|---|---|
| JP | 2005345402 A | 12/2015 |
| WO | 2018039455 A1 | 3/2018 |
| WO | 2018156643 | 8/2018 |
| WO | 2018156688 | 8/2018 |
| WO | 2018156793 | 8/2018 |
| WO | 2018210776 | 11/2018 |
| WO | 2019191778 A1 | 10/2019 |
| WO | 2020/190704 A1 | 9/2020 |
| WO | 2021167657 A2 | 8/2021 |
| WO | 2021167657 A3 | 8/2021 |

OTHER PUBLICATIONS

Lumotive, LLC, International Patent Application No. PCT/US20/22599, International Search Report and Written Opinion dated Jul. 23, 2020, 12 pp.

Askelrod, U.S. Appl. No. 17/098,213, Non-Final Office Action dated Jan. 25, 2021, pp. 1-19.

"Unique" Definition, Meriam-Webster, downloaded Jan. 15, 2021 from https://www.merriam-webster.com/dictionary/unique, 9 pages (Year:2021).

Derickson et al., Self-Mode Locking of a Semiconductor Laser Using Positive Feedback, Feb. 1990, Applied Physics Letters, https://www.researchgate. net/publication/224422317_Self-Mode-Locking_of_a_Semiconductor_Laser_Using_Positive_Feedback>, pp. 7-9.

Lumotive, International Patent Application No. PCT/US20/60601, International Search Report and Written Opinion dated Sep. 9, 2021, 9 pp.

Huang et al., "Gate-tunable conducting oxide metasurfaces," Nano Lett. 16, 5319 (2016).

Pors, Bozhevolnyi, "Plasmonic metasurfaces for efficient phase control in reflection," Opt. Express 21, 27438 (2013).

Arbabi et al., "Subwavelength-thick lenses with high numerical apertures and large efficiency based on high contrast transmitarrays," Nat. Commun. 6, 1 (2014).

Haffner et al., "All-plasmonic Mach-Zehnder modulator enabling optical high-speed communication at the microscale." Nat. Photonics 9, 525-528 (2015).

Li et al., "Poling efficiency enhancement of tethered binary nonlinear optical chromophores for achieving an ultrahigh n3r33 figure-of-merit of 2601 pm V?1" J. Mater. Chem. C 3, 6737-6744 (2015).

Zhang et al., "High performance optical modulator based on electro-optic polymer filled silicon slot photonic crystal waveguide," J. Light. Technol. 34, 2941-2951 (2016).

Xing et al., "Digitally controlled phase shifter using an SOI slot waveguide with liquid crystal infiltration," 27, 1269-1272 (2015).

Borshch et al., "Nanosecond electro-optic switching of a liquid crystal," Phys. Rev. Lett. 111, 107802 (2013).

Chen et al., "Ultra-low viscosity liquid crystal materials," Opt. Mater. Express 5, 655 (2015).

Gholipour et al., "An all-optical, non-volatile, bidirectional, phase-change meta-switch," Adv. Mater. 25, 3050 (2013).

Raoux et al., "Phase change materials and phase change memory," MRS Bull. 39, 703 (2014).

Rios et al., "Integrated all-photonic non-volatile multi-level memory," Nat. Photonics 9, 725 (2015).

International Application No. PCT/US2018/019107, International Search Report dated Jun. 25, 2018; pp. 1-3.

International Application No. PCT/US2019/022935, International Search Report dated Jul. 4, 2019; pp. 1-5.

U.S. Appl. No. 15/900,676, Requirement for Restriction/Election dated Jun. 25, 2020, pp. 1-7.

Funkhouser, T. et al., 'Survey of Methods for Modeling Sound Propagation in Interactive Virtual Environment Systems,' Princeton University, Department of Computer Science, 2003, pp. 1-53.

U.S. Appl. No. 15/924,744, Non-Final Office Action dated Feb. 15, 2019, pp. 1-11.

U.S. Appl. No. 16/357,288 Non-Final Office Action dated Oct. 7, 2020, pp. 1-8.

Wang, et al., A 60GHz Passive Repeater Array with Endfire Radiation Based on Metal Groove Unit-Cells, 9th European Conference on Antennas and Propagation (EuCAP2015), Apr. 2015, Lisbon, Portugal, 5 pp.

\* cited by examiner

OFF

ON

TUNABLE OPTICAL DEVICE CONFIGURATIONS AND PACKAGING

TECHNICAL FIELD

This disclosure relates to optical metasurfaces, reflectors, deflectors, and antenna elements. Various optical metasurface device configurations, layouts, packaging, and manufacturing techniques are described herein.

DETAILED DESCRIPTION

Figure 1A:
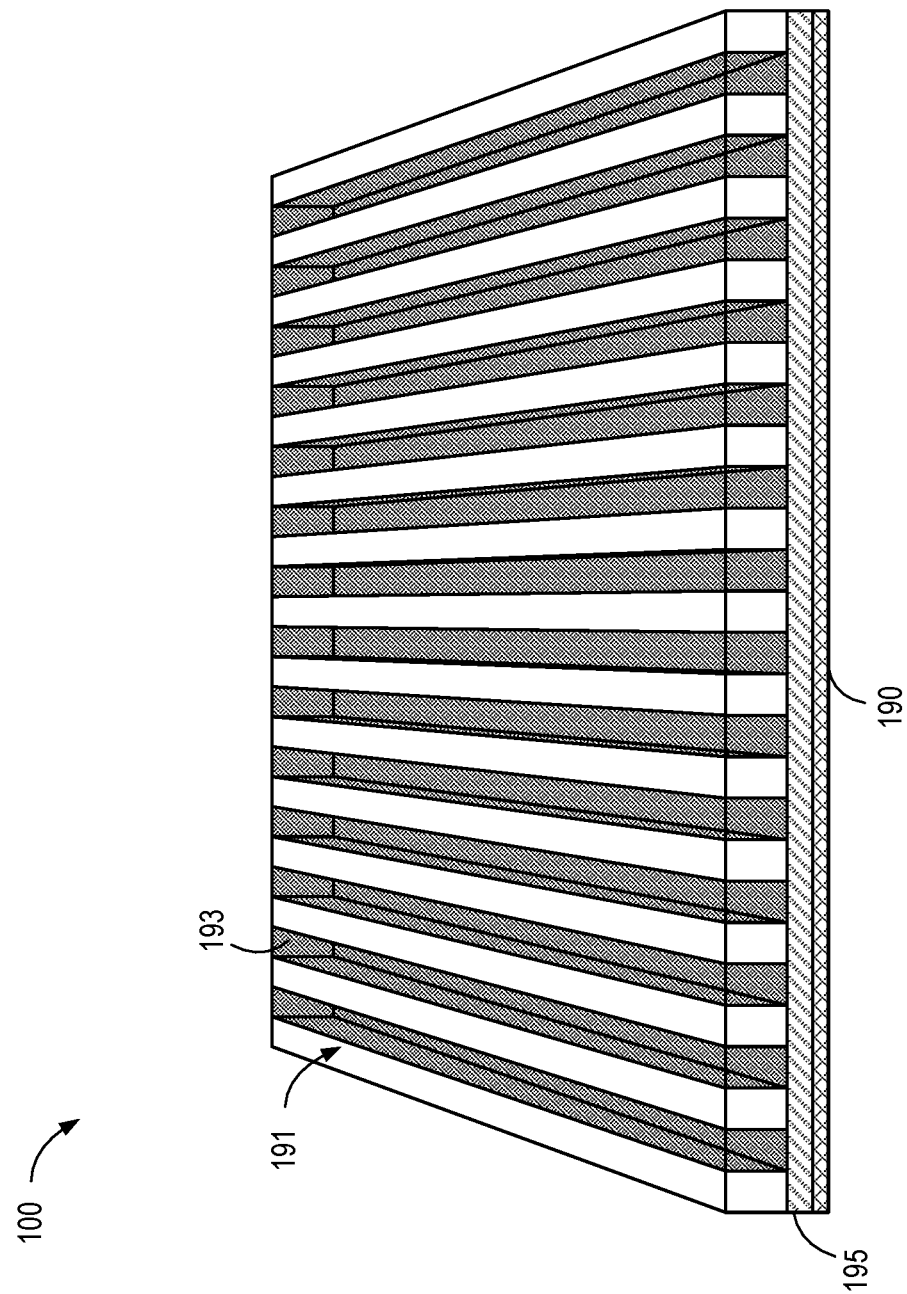
FIG. 1A illustrates an example of a tunable liquid crystal metasurface (LCM), according to one embodiment.

Tunable optical metasurfaces may be used for beamforming, including three-dimensional beam shaping, two-dimensional beam steering, and one-dimensional beam steering. The presently described systems and methods can be applied to tunable metasurfaces utilizing various architectures and designs. In general, a metasurface includes a plurality of optical structures that, together with a tunable dielectric material, can be operated to deflect (e.g., reflect, refract, steer, defocus, focus, converge, diverge, etc.) optical radiation within an operational bandwidth.

According to various embodiments, an optically transmissive cover is sealed to a substrate to form a sealed chamber. A metasurface that includes a plurality of optical structures is positioned on the substrate within the sealed chamber. A dielectric material with a tunable refractive index is encapsulated within the sealed chamber around the optical structures of the metasurface. In some embodiments, a controller or metasurface driver selectively applies a pattern of voltages to an array of optical structures to selectively modify the refractive indices of regions of the dielectric material between adjacent optical structures. A combination of phase delays created by the pattern of applied voltages creates constructive interference in the desired beam steering direction.

Various specific examples of tunable optical metasurfaces are described herein and depicted in the figures. For example, in one specific embodiment, a tunable optical metasurface includes an array of elongated resonator rails arranged parallel to one another with respect to an optical reflector, such as an optically reflective layer of metal or a Bragg reflector. In such an embodiment, the resonator rails may be formed from metal, a doped semiconductor material, or a dielectric material. Liquid crystal, or another refractive index tunable dielectric material, is positioned in the gaps or channels between adjacent resonator rails. Liquid crystal is used in many of the examples provided in this disclosure. However, it is appreciated that alternative dielectric materials with tunable refractive indices and/or combinations of different dielectric materials with tunable refractive indices may be utilized instead of liquid crystal in many instances.

For the sake of clarity and to avoid unnecessary repetition, the alternative dielectric materials are not called out in connection with every example provided herein. Nevertheless, the use or substitution of alternative tunable dielectric materials in each of the examples provided herein is explicitly contemplated and encompassed by this disclosure. Examples of dielectric materials with tunable refractive indices suitable for use in the various example metasurfaces described herein include but are not limited to various forms and combinations of liquid crystal, electro-optic polymers, chalcogenide glasses, and semiconductor materials.

In some embodiments, an optically tunable metasurface includes a two-dimensional array of pillars instead of (or possibly in combination with) elongated rails. Regardless of the exact optical structures utilized in the metasurface, the tunable metasurface may include liquid crystal or another refractive index tunable dielectric material in, around, between, and/or on the optical structures. For example, liquid crystal may fill the channels between resonator rails, fill the gaps between neighboring pillars, and/or form a layer of liquid crystal above the rails or pillars. Examples of suitable metals that may be used as optical reflectors and optical structures in a metasurface include, but are not limited to, copper, aluminum, gold, silver, platinum, titanium, and chromium.

In various embodiments, biasing the liquid crystal in a metasurface with a pattern of voltage biases changes the reflection phase of the optical radiation (or transmission phase). For example, in embodiments using reflective-type metasurfaces, biasing the liquid crystal in the metasurface with a pattern of voltage biases can be used to change the reflection phase pattern of optical radiation reflected by an underlying reflector layer. Each different voltage pattern applied across the metasurface corresponds to a different reflection phase pattern (or transmission phase pattern in transmissive designs). With a one-dimensional array of optical structures (such as a one-dimensional array of resonator rails), each different reflection phase pattern corresponds to a different steering angle in a single dimension. A digital or analog controller (controlling current and/or voltage), such as a metasurface driver, may apply a voltage differential bias pattern, such as a blazed grating pattern, to the metasurface to achieve a target beam shaping, such as a target beam steering angle. The term "beam shaping" is used herein in a broad sense to encompass one-dimensional beam steering, two-dimensional beam steering, wavelength filtering, beam divergence, beam convergence, beam focusing, and/or controlled deflection, refraction, or reflection of incident optical radiation.

This disclosure includes various embodiments and variations of tunable optical metasurface devices, methods for manufacturing the same, and associated packaging systems and configurations. Some embodiments of optical metasurfaces described herein include optical structures positioned on a planar substrate or another layer of a semiconductor device. In other embodiments, the optical metasurfaces include optical structures positioned with a cavity etched or otherwise formed in a substrate or other layer of a semiconductor device. For example, in some of the illustrated embodiments, optical structures are positioned within a cavity that is etched into a dielectric layer formed or deposited on a substrate. The etched cavity may be, for example, a rectangular cavity with a depth sufficient to accommodate the heights of the optical structures of a metasurface formed within the cavity.

For example, a cavity may have a depth between 0.1 microns and 20 microns to accommodate a metasurface with a reflective layer and optical structures extending from the base of the cavity to a combined height less than the depth of the cavity, such that the optical structures do not extend out of the cavity. An optically transparent cover may be sealed around a perimeter of the cavity (e.g., to the sidewalls of the cavity or along the rim of the cavity) like a lid to form a sealed chamber. A liquid crystal or another refractive index tunable dielectric material may be captured within the sealed chamber around the optical structures of the metasurface. In embodiments that include transmissive metasurfaces, the cavity may not include a reflective layer.

For example, the captured liquid crystal can fill the sealed chamber and flow between, on, around, and/or over the optical structures of a metasurface. In some embodiments, the cover is a planar layer of an optically transparent material that is supported by the rim of the dielectric layer, such that the cover spans the cavity unsupported above the optical structures of the metasurface. The volume of the sealed chamber in such embodiments depends on the thickness of the dielectric material, the depth of the etched cavity, the size of the metasurface within the etched cavity, and the thickness of any spacers, spacer beads, and/or epoxies used to seal and/or support the cover.

General embodiments of the systems and methods described herein include tunable optical devices that have one or more substrate layers and one or more dielectric layers. A cavity or depression may be formed in a substrate layer or a dielectric layer to accommodate a metasurface. The exact dimensions of the cavity can vary based on the size of the metasurface, which may vary based on the specific application and manufacturing process utilized. In one example, the cavity is large enough to accommodate a rectangular metasurface that is between 10 and 50 millimeters on each side. The cavity may be a fraction of a micron deep or several microns deep, depending on the specific configuration and the height of the resonator structures of a particular metasurface.

To reduce the amount of liquid crystal needed to fill the sealed chamber, some embodiments described herein include a cover that includes an optically transparent protrusion or optically transparent patterned material (such as patterned photoresist) that extends from the cover into the sealed chamber. The optical characteristics of the tunable optical device (e.g., beam steering efficiency) can be improved in some instances by reducing the thickness or amount of the liquid crystal within the sealed chamber.

The optically transmissive cover, protrusion, and/or patterned material may comprise glass, plastic, sapphire, quartz, and/or a combination thereof. Other optically transparent materials may be used in some embodiments. For the sake of clarity and to avoid unnecessary repetition, most of the examples provided herein refer to a glass cover without exhaustively listing all the possible alternative cover materials each time. Accordingly, the use or substitution of alternative cover materials in each of the examples provided herein is explicitly contemplated and encompassed by this disclosure.

In some of the embodiments illustrated and described herein, the cover is only spaced between a fraction of a micron to a few microns from the upper surfaces of the optical structures of a metasurface to minimize or reduce the volume of the sealed chamber and/or minimize or reduce the thickness of the liquid crystal between the upper surfaces of the optical structures and the cover. In some embodiments, a glass cover is supported by the rim of the dielectric material and spans the entirety of a cavity formed in the dielectric material. Thicker and/or more rigid glass layers may be sufficiently strong to span the cavity without significant deformation or risk of breaking. Thinner and/or weaker glasses may be susceptible to deformation, sagging, and/or flexing under pressure and changes in temperature. If the glass cover bows or flexes toward the optical structures of the metasurface, it is possible that the glass cover could damage the optical structures of the metasurface. To reduce the risk of damage and/or allow for looser manufacturing and material tolerances, some of the embodiments described herein include metal spacers, dielectric spacers, and/or thicker epoxy and spacer bead combinations to space the glass cover further from the optical structures of the metasurface.

Some of the embodiments described herein, including in particular some of the embodiments that include relatively large-volume sealed chambers, include an electrode on the surface of the cover within the sealed chamber. A large volume of liquid crystal above the metasurface that is not well aligned can reduce the optical performance of the metasurface due to uncontrolled rotation of incident light polarization. For example, a transparent electrode, such as an indium tin oxide (ITO) electrode layer, may be formed or otherwise positioned on a surface of a glass cover within the sealed chamber and in contact with the liquid crystal therein. The ITO electrode can be voltage controlled to orient the liquid crystal above the metasurface to improve the optical performance of the tunable optical device.

Other embodiments described herein reduce the volume of the sealed chamber, provide additional support for the cover, and/or protect the optical structures of the metasurface from the cover using spacers. Specifically, some embodiments described herein include one or more metal or dielectric spacers, referred to as support spacers, that extend from within the substrate on which the metasurface is formed (or from within the cavity in which the metasurface is located) to directly support the glass cover and/or a photoresist or other material patterned on the glass cover. In other embodiments, spacers may extend from the substrate or cavity to a height above the optical structures of the metasurface, but not sufficiently high to directly support the glass cover and/or a patterned photoresist. In such embodiments, one or more mid-array spacers, referred to as protective spacers, operate to prevent a bowed or flexed glass cover and/or photoresist layer from contacting the optical structures of the metasurface.

It is appreciated that the metasurface technologies described herein may incorporate or otherwise leverage prior advancements in surface scattering antennas, such as those described in U.S. Patent Publication No. 2012/0194399; U.S. Patent Publication No. 2019/0285798 and U.S. Patent Publication No. 2018/0241131, which publications are hereby incorporated by reference in their entireties. Additional elements, applications, and features of surface scattering antennas that feature a reference wave or feed wave are described in U.S. Patent Publication Nos. 2014/0266946, 2015/0318618, 2015/0318620, 2015/0380828, 2015/0162658, and 2015/0372389, each of which is hereby incorporated by reference in its entirety. Specific descriptions of optical resonant antenna configurations and feature sizes are described in U.S. patent application Ser. Nos. 15/900,676, 15/900,683, 15/924,744, and 17/685,621, each of which is hereby incorporated by reference in its entirety.

Throughout this disclosure, examples of transmitting (or receiving) embodiments are provided with the understanding that reciprocal receiving (or transmitting) embodiments are also contemplated. Similarly, it is understood that a system may operate as only a transmitter, only a receiver, simultaneously as a transmitter and receiver, with a time-multiplexed transmitter/receiver, with a frequency-multiplexed transmitter/receiver, with the first metasurface acting as a transmitter and a second metasurface acting as a receiver, or another transmit/receive configuration or operation technique. Similarly, many of the examples are described in terms of modifying a reflection phase pattern of a reflective-type metasurface. However, it is appreciated that many of the approaches, techniques, systems, methods, and principles taught herein can be applied to transmissive-type metasurfaces as well. Accordingly, each embodiment in which a reflective-type metasurface is described should be understood as implicitly teaching a corresponding embodiment using a transmissive-type metasurface.

Additionally, many of the described embodiments of metasurfaces are described in terms of controlling, tuning, or modifying phase patterns (e.g., reflection phase patterns or transmission phase patterns). However, many of the embodiments may be used in conjunction with metasurfaces in which the optical elements are tuned or adjusted to control (i) the reflection/transmission phase, (ii) the reflection/transmission amplitude, or (iii) the reflection/transmission phase and the reflection/transmission amplitude. Accordingly, any of a wide variety of metasurfaces may be utilized in any of the embodiments described herein that operate to control the complex phase and/or complex amplitude of the reflected or transmitted optical radiation. Accordingly, while specific examples are described and illustrated herein, it is understood that the various embodiments may be modified or adapted for use with alternative embodiments of optical metasurfaces and are not limited to the specifically described and illustrated examples.

The presently described embodiments support optical bandwidths and are, for example, suitable for optical sensing systems such as LiDAR, optical communications systems, optical computing systems, and displays. For example, the systems and methods described herein can be configured with metasurfaces that operate in the sub-infrared, mid-infrared, high-infrared, and/or visible-frequency ranges (generally referred to herein as "optical"). Given the feature sizes needed for sub-wavelength optical antennas and antenna spacings, the described metasurfaces may be manufactured using micro-lithographic and/or nano-lithographic processes, such as fabrication methods commonly used to manufacture complementary metal-oxide-semiconductor (CMOS) integrated circuits.

Some of the infrastructure that can be used with embodiments disclosed herein is already available, such as general-purpose computers, computer programming tools and techniques, digital storage media, and communication links. Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific control function.

It is also appreciated that two or more of the elements, devices, systems, subsystems, components, modules, etc. that are described herein may be combined as a single element, device, system, subsystem, module, or component. Moreover, many of the elements, devices, systems, subsystems, components, and modules may be duplicated or further divided into discrete elements, devices, systems, subsystems, components, or modules to perform subtasks of those described herein. Any of the embodiments described herein may be combined with any combination of other embodiments described herein.

To the extent used herein, a computing device, system, subsystem, module, driver, or controller may include a processor, such as a microprocessor, a microcontroller, logic circuitry, or the like. A processor may include one or more special-purpose processing devices, such as application-specific integrated circuits (ASICs), programmable array logic (PAL), programmable logic array (PLA), a programmable logic device (PLD), field-programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented or enhanced using hardware, software, firmware, or a combination thereof.

The components of some of the disclosed embodiments are described and illustrated in the figures herein to provide specific examples. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once. As previously noted, descriptions and variations described in terms of transmitters are equally applicable to receivers, and vice versa.

FIG. 1A illustrates an example of a tunable liquid crystal metasurface (LCM) 100, according to one embodiment. The tunable LCM 100 can, for example, be used as part of a solid-state optical transmitter system, receiver system, or transceiver system. As illustrated, the tunable LCM 100 includes an optically reflective substrate 190 and a dielectric layer 195. A plurality of elongated rails 191 are arranged at sub-wavelength intervals on the optically reflective substrate 190 and electrically separated by the dielectric layer 195. The elongated rails 191 are referred to herein as "resonator rails" because the gaps between them (filled with liquid crystals or other dielectrics that can be tuned to adjust a refractive index) are resonant within the optical operational bandwidth of the LCM. Liquid crystal or another refractive index tunable dielectric material 193 is positioned between the elongated rails 191. A controller or metasurface driver (not illustrated) may apply voltage differential bias patterns to the elongated rails 191 to modify a reflection phase of the resonator (or transmission phase of the resonator in transmissive designs). The combination of phase delays imparted from all the resonators creates constructive interference in the desired beam steering direction.

Figure 1B:
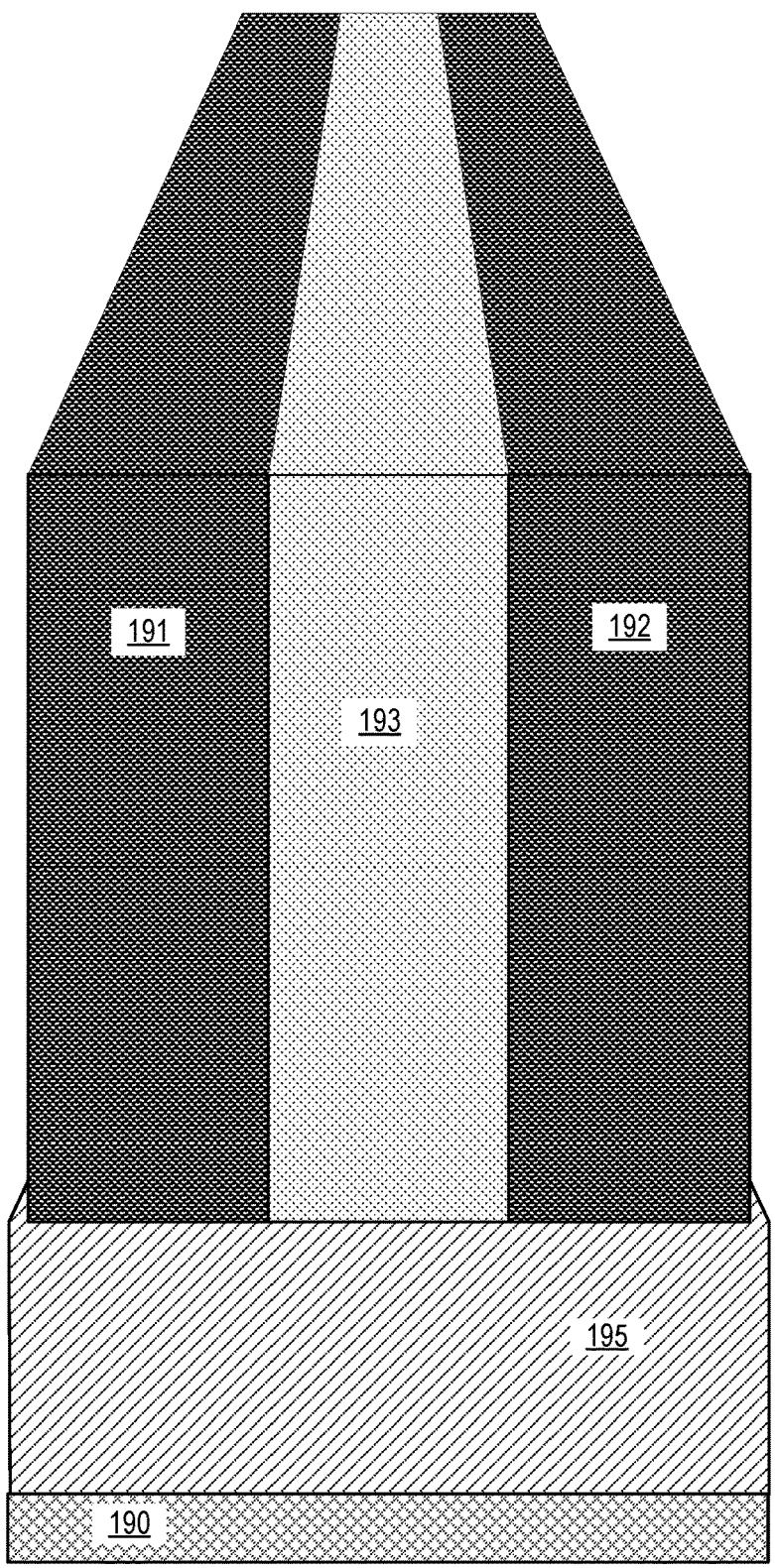
FIG. 1B illustrates a close-up view of liquid crystal positioned between two parallel elongated resonator rails of a tunable LCM, according to one embodiment.

FIG. 1B illustrates a close-up view of liquid crystal 193 positioned between two, parallel elongated resonator rails 191 and 192, according to one embodiment. As illustrated, the elongated resonator rails 191 and 192 extend from a reflective surface 190 and are electrically isolated from the reflective surface 190 via the dielectric layer 195.

Additional descriptions, variations, functionalities, and usages for optical metasurfaces are described in U.S. Pat. No. 10,451,800 granted on Oct. 22, 2019, entitled "Plasmonic Surface-Scattering Elements and Metasurfaces for Optical Beam Steering;" U.S. Pat. No. 10,665,953 granted on May 26, 2020, entitled "Tunable Liquid Crystal Metasurfaces;" and U.S. Pat. No. 11,092,675 granted on Aug. 17, 2021, entitled "Lidar Systems based on Tunable Optical Metasurfaces," each of which is hereby incorporated by reference in its entirety. Many of the metasurfaces described in the above-identified U.S. patents include parallel rails positioned above a two-dimensional or planar reflective surface or layer.

Figures 2A, 2B, 2C:
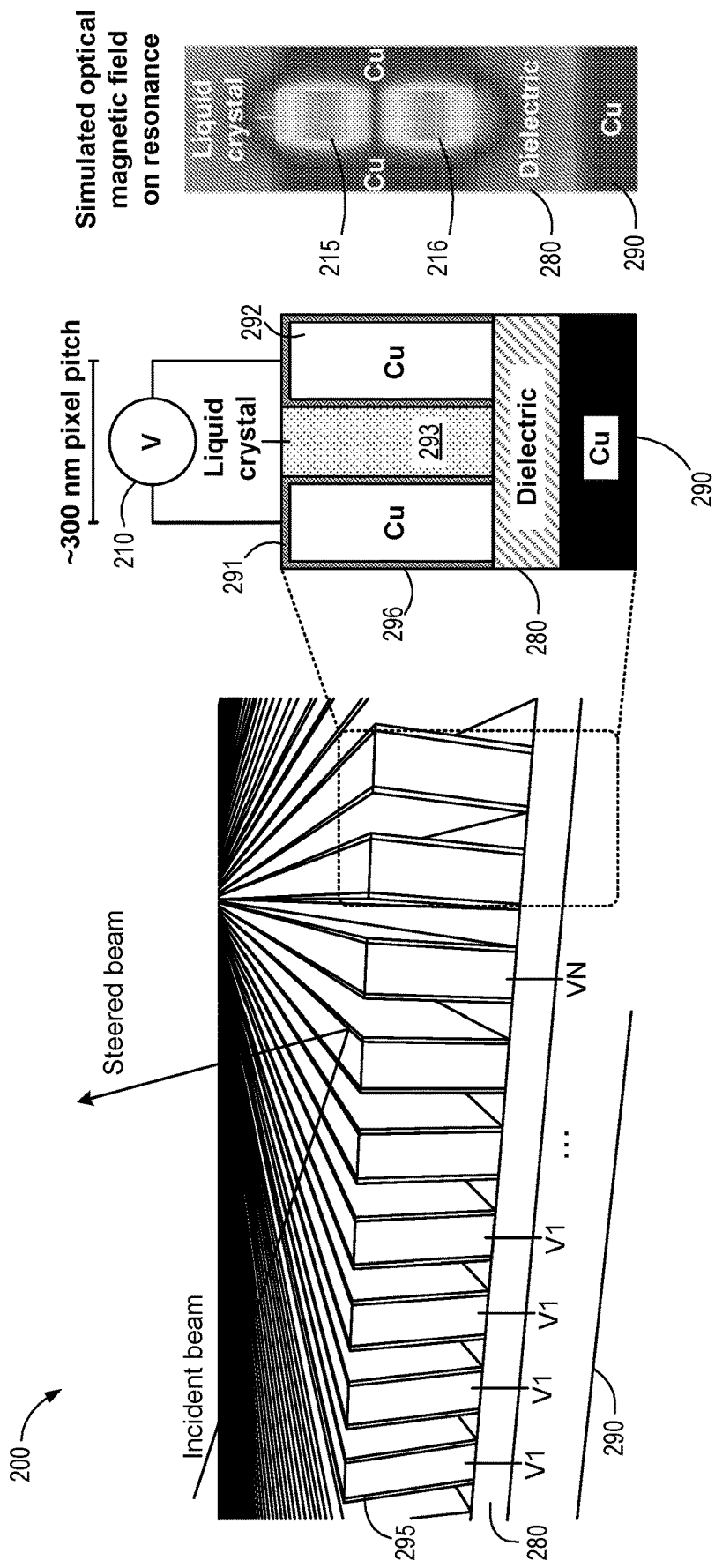
FIG. 2A illustrates a perspective view of perpendicular rails of an LCM extending from a reflective surface, according to one embodiment.
FIG. 2B illustrates an optically reflective copper surface covered with an insulating layer and metal rails extending therefrom with liquid crystal therebetween, according to one embodiment.
FIG. 2C illustrates a simulated optical magnetic field of resonance between two adjacent rails extending from an optically reflective copper surface, according to one embodiment.

FIG. 2A illustrates an example of an optically reflective metasurface 200 with a reflective surface 280, such as a metal reflector or a dielectric reflector. The reflective surface 280 has an insulating layer (not shown) to provide electrical insulation from the resonator rails 295. Each of the resonator rails 295 is illustrated with an optional electrically insulating layer 296 (FIG. 2B). In some embodiments, the electrically insulating layer 296 may also cover the tops of each of the resonator rails 295. In alternative embodiments, the reflective surface 280 may be replaced with an optically transmissive surface, such that the metasurface 200 operates to deflect optical radiation through the device instead of reflecting the optical radiation.

FIG. 2B illustrates a specific embodiment of a tunable optical resonant antenna comprising two adjacent resonator rails 291 and 292 extending from an optically reflective copper surface 290. The resonator rails 291 and 292 extend vertically from the optically reflective surface 290 but are electrically insulated therefrom by a layer of oxide or other dielectric material 280. An insulating layer 296 (e.g., silicon nitride or another electrically insulating layer) covers each of the copper resonator rails 291 and 292. Liquid crystal 293 is deposited within a gap between the adjacent copper resonator rails 291 and 292. A voltage controller 210 (such as a metasurface driver) applies a voltage to the copper resonator rails 291 and 292. The reflection phase associated with the liquid crystal 293 is tunable based on the voltage differential between the copper resonator rails 291 and 292 generated by the voltage controller 210.

FIG. 2C illustrates the optical field region with two resonant nodes 215 and 216 associated with adjacent copper resonator rails 291 and 292 extending from the oxide layer 280 on the optically reflective surface 290, according to one embodiment. An electric field applied by the voltage controller 210 tunes the optical resonant antenna by modifying the index of refraction of the liquid crystal 293 applied on, around, and/or between the copper resonator rails 291 and 292.

Figure 3A:
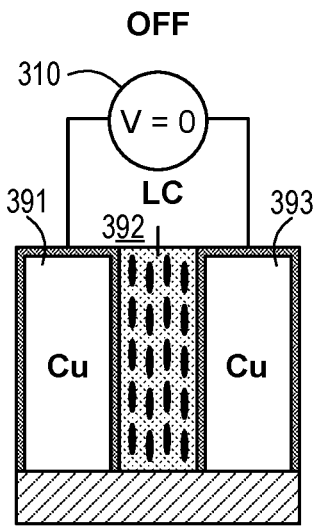
FIG. 3A illustrates the liquid crystal between two metal rails aligned in a first direction to provide a first refractive index without any applied voltage, according to one embodiment.

FIG. 3A illustrates the liquid crystal 392 between two metal rails 391 and 393, according to one embodiment. As illustrated, the liquid crystal is aligned in a first direction corresponding to a first refractive index without voltage applied by the voltage controller 310.

Figure 3B:
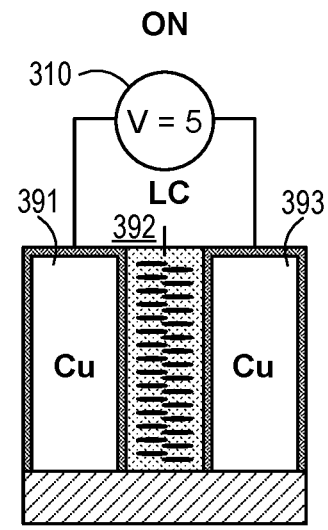
FIG. 3B illustrates the liquid crystal between the two metal rails aligned in a second direction to provide a second refractive index with an applied voltage of 5 volts, according to one embodiment.

FIG. 3B illustrates the liquid crystal 392 between the two metal rails 391 and 393 aligned in a second direction that results in a second refractive index based on an applied voltage of 5 volts, according to one embodiment.

Figure 3C:
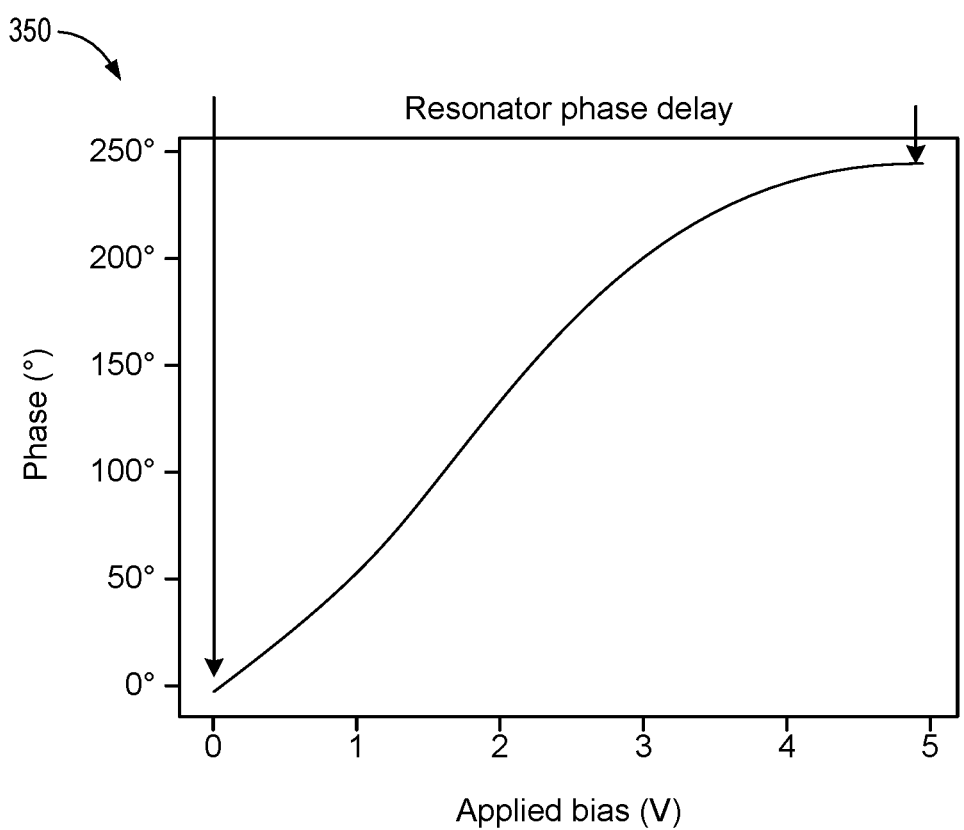
FIG. 3C illustrates a graph of a phase response of an LCM unit cell with respect to applied voltage values, according to one embodiment.

FIG. 3C illustrates a graph 350 of a phase response of an LCM unit cell with respect to applied voltage values, according to one embodiment.

Figure 4A:
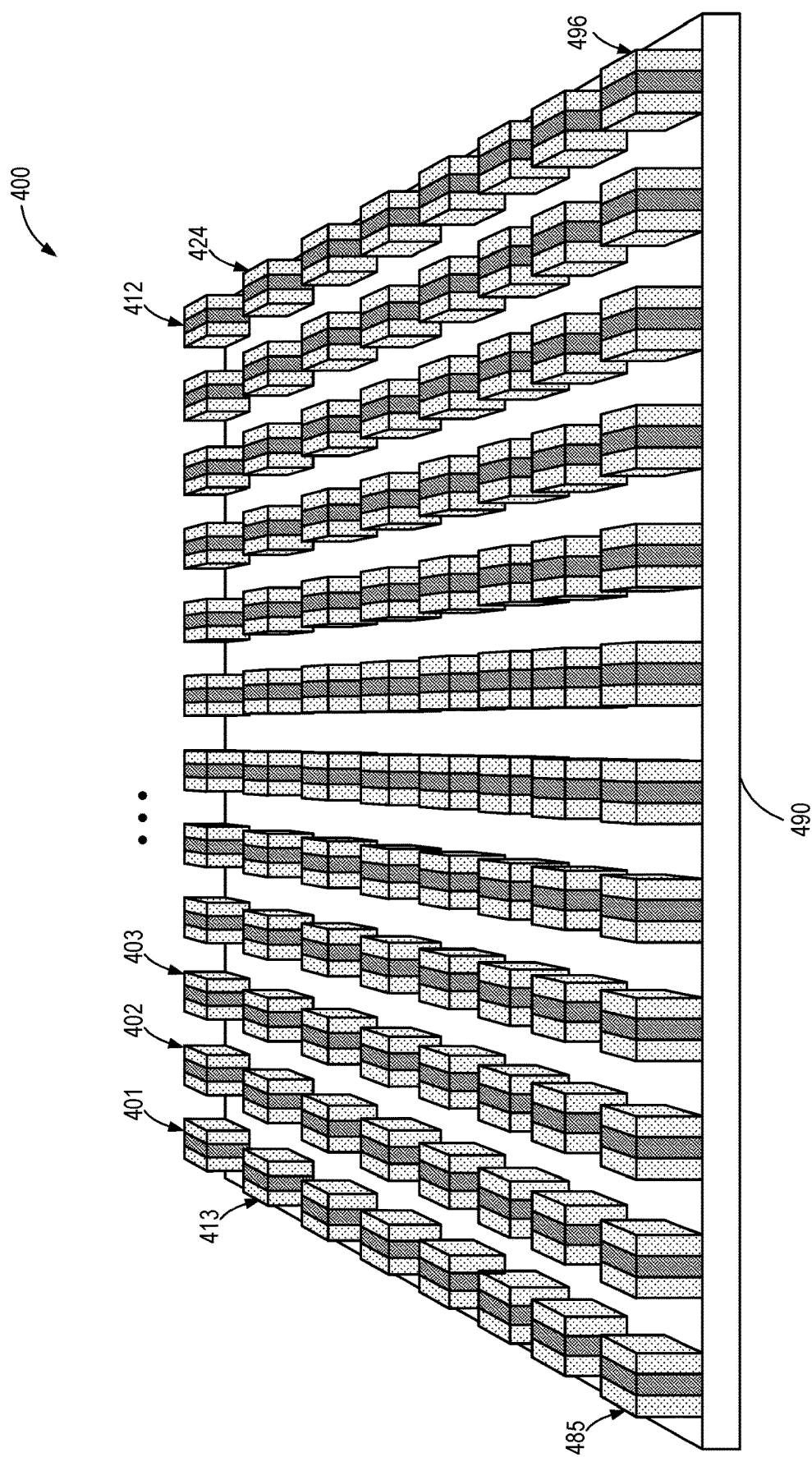
FIG. 4A illustrates a simplified embodiment of an optical surface scattering device with pairs of metallic or dielectric pillars with adjustable refractive index material therebetween, according to one embodiment.

FIG. 4A illustrates a simplified embodiment of an optical surface scattering device 400 with one hundred and ninety-two pillar-shaped dielectric members (lighter shading) arranged in ninety-six pillar pairs with an adjustable refractive index material (darker shading) therebetween to form ninety-six dielectric resonator structures 401-496 (only some of which are labeled to avoid obscuring the drawing). Each of the pillar-shaped dielectric resonator structures 401-496 is configured with a target Q factor. The target Q factor is achieved based on the material of the dielectric resonator structure, the height to which each pillar-shaped dielectric member extends from the surface 490, and the width of each pillar-shaped dielectric member. A more thorough description and several variations of optical surface scattering devices utilizing two-dimensional arrays of pillars can be found in the patent applications and patent publications identified and incorporated by reference herein.

Figure 4B:
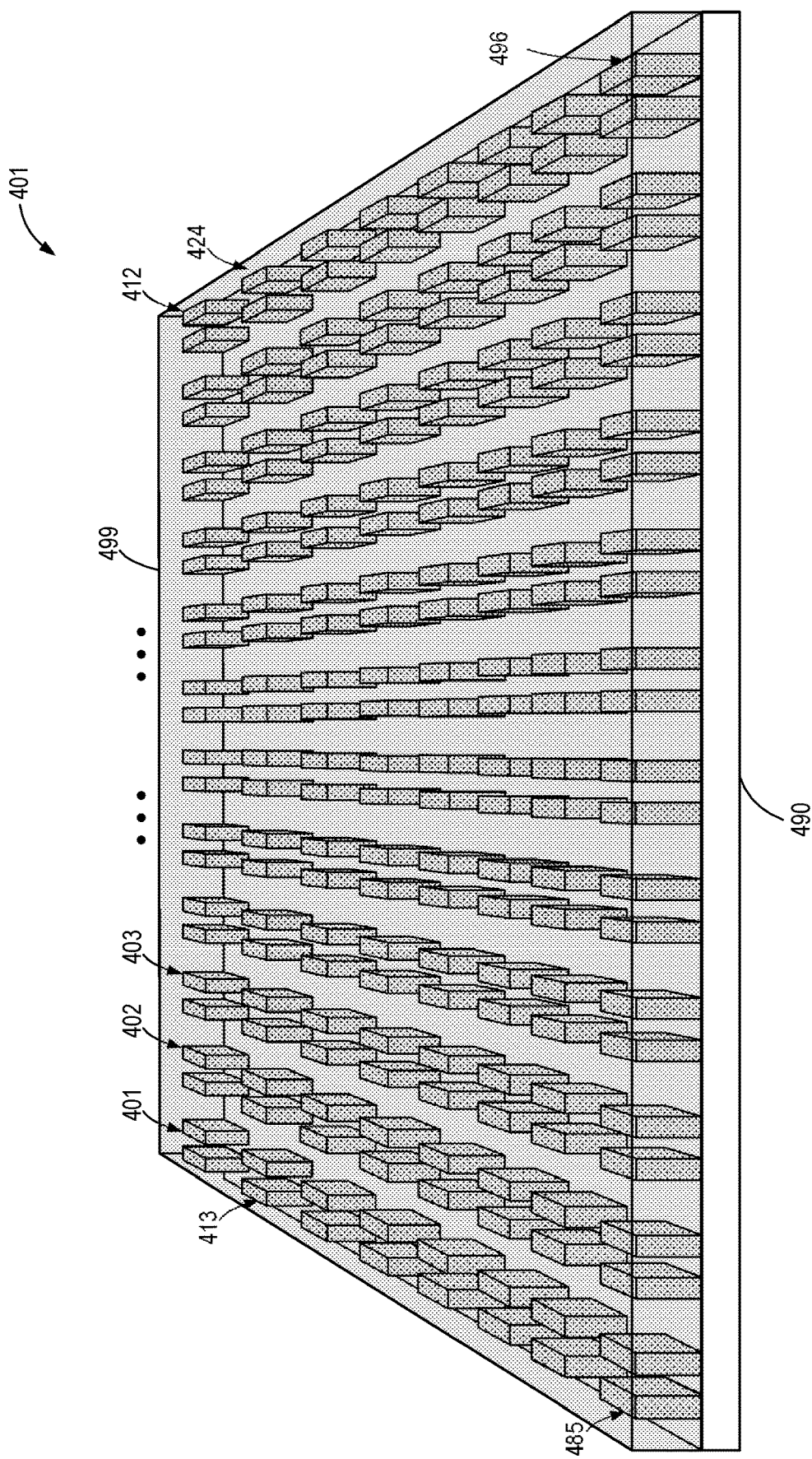
FIG. 4B illustrates a simplified embodiment of an optical surface scattering device with an adjustable refractive index material around pairs of pillars, according to one embodiment.

FIG. 4B illustrates a simplified embodiment of an optical surface scattering device 401 with an adjustable refractive index material 499 forming an encompassing layer around the pairs of pillars 401-496, including above the pillars and in between the pillar pairs, according to another embodiment.

Figure 5A:
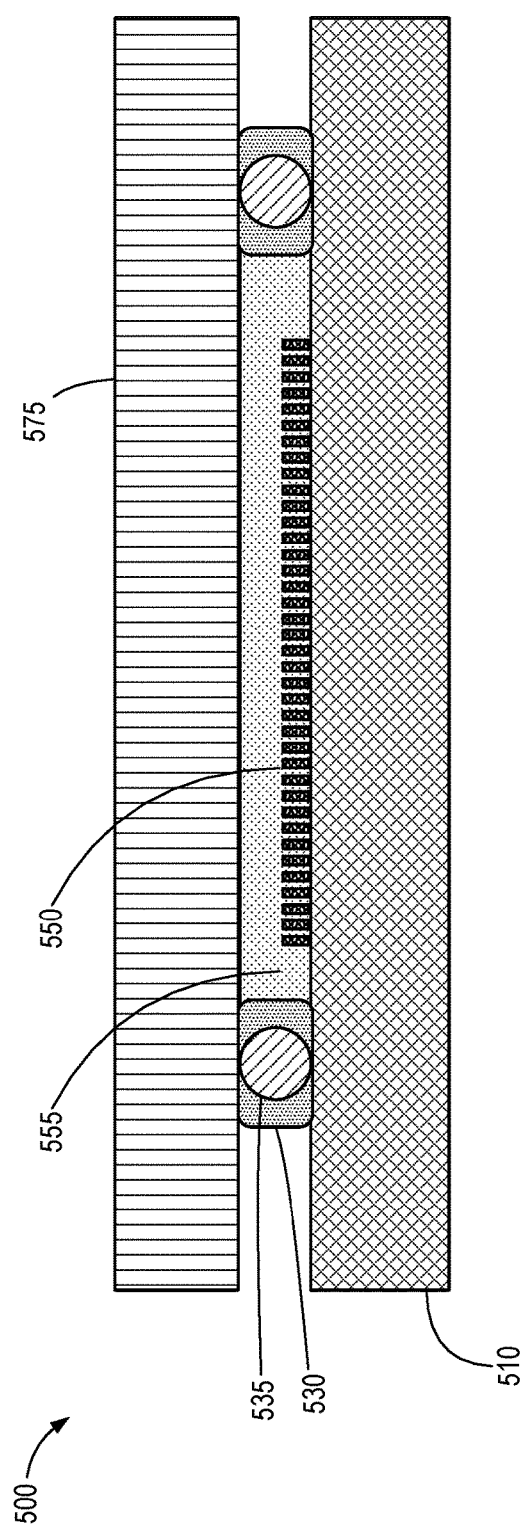
FIG. 5A illustrates a side-cutaway view of the layers of an embodiment of a tunable optical device with a metasurface and a tunable dielectric material within a sealed chamber.

FIG. 5A illustrates a side-cutaway view of the layers of an embodiment of a tunable optical device 500 with a metasurface 550 and a tunable dielectric material 555 within a sealed chamber. As illustrated, the tunable optical device 500 includes a metasurface 550 formed on a substrate 510.

The metasurface 550 may be embodied as any of a wide variety of possible metasurfaces. The metasurfaces can be transmissive or reflective, made of dielectric or metallic structures, and the elements may be resonant or non-resonant. The illustrated metasurface 550 is simplified to show only optical structures extending vertically from the substrate 510. While not illustrated to avoid obscuring the drawing, the metasurface 550 may include a reflective layer(s), conductive wires, coating, and/or other optical or electrical components. The metasurface 550 may, for example, be embodied as a one-dimensional array of resonant rails or a two-dimensional array of resonant pillars or pillar pairs.

An optically transmissive cover 575, such as a glass cover, may be sealed to the substrate 510 to form a sealed chamber that houses the metasurface 550 and secures a dielectric material 555 with a tunable refractive index. The cover 575 may be secured to the substrate 510 via any of a wide variety of sealants, epoxies, glues, adhesives, binders, fixatives, or the like. In the illustrated embodiment, the cover 575 is secured to the substrate 510 via an epoxy 530 with a spacer bead 535. The spacer bead 535 maintains a minimum gap between the cover 575 and the substrate 510 to prevent the cover 575 from compressing the epoxy 530 too thin and/or allowing the lower surface of the cover 575 to contact and potentially damage components of the metasurface 550.

Figure 5B:
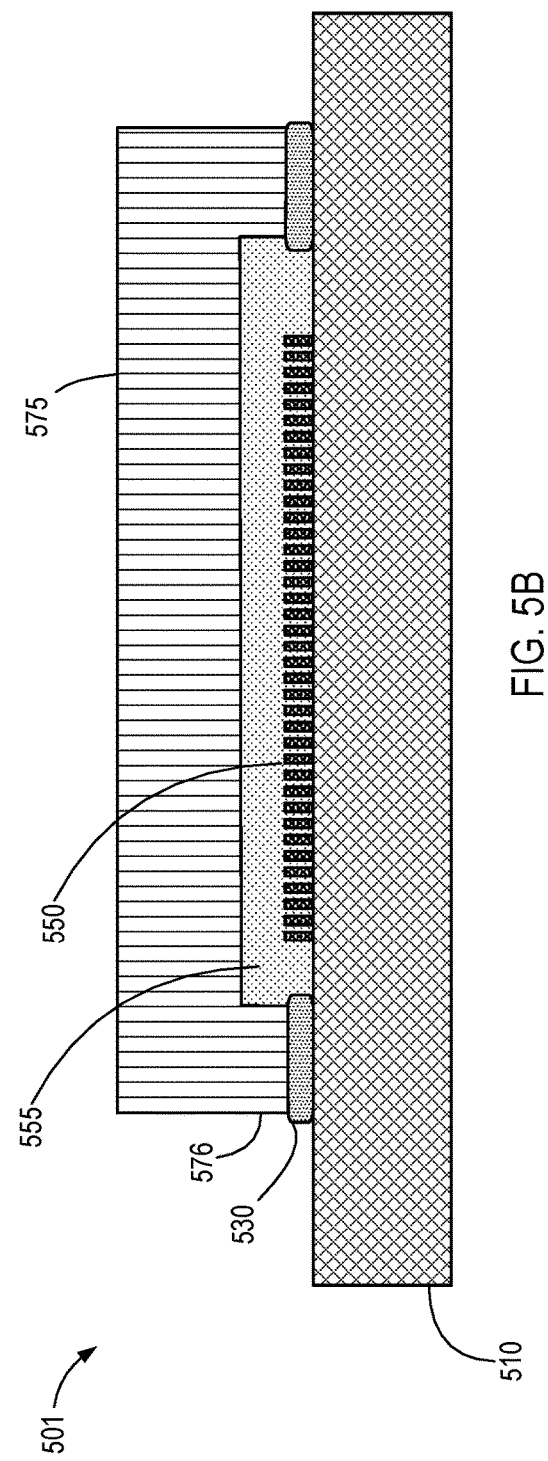
FIG. 5B illustrates a side-cutaway view of the layers of another embodiment of a tunable optical device with a metasurface and a tunable dielectric material within a sealed chamber.

FIG. 5B illustrates a side cutaway view of the layers of another embodiment of a tunable optical device 501 with a metasurface 550 and a tunable dielectric material 555 within a sealed chamber. Similar to FIG. 5A, the tunable optical device 501 includes a metasurface 550 formed on a substrate 510. However, the tunable optical device 501 includes an optically transmissive cover 575 that is non-planar. The epoxy 530 seals the extended rim 576 of the cover 575 to form the sealed chamber that houses the metasurface 550. The extended rim 576 of the cover forms a cavity in the cover 575 to accommodate the metasurface 550 and the dielectric material 555 with a tunable refractive index, such as liquid crystal.

Figure 6A:
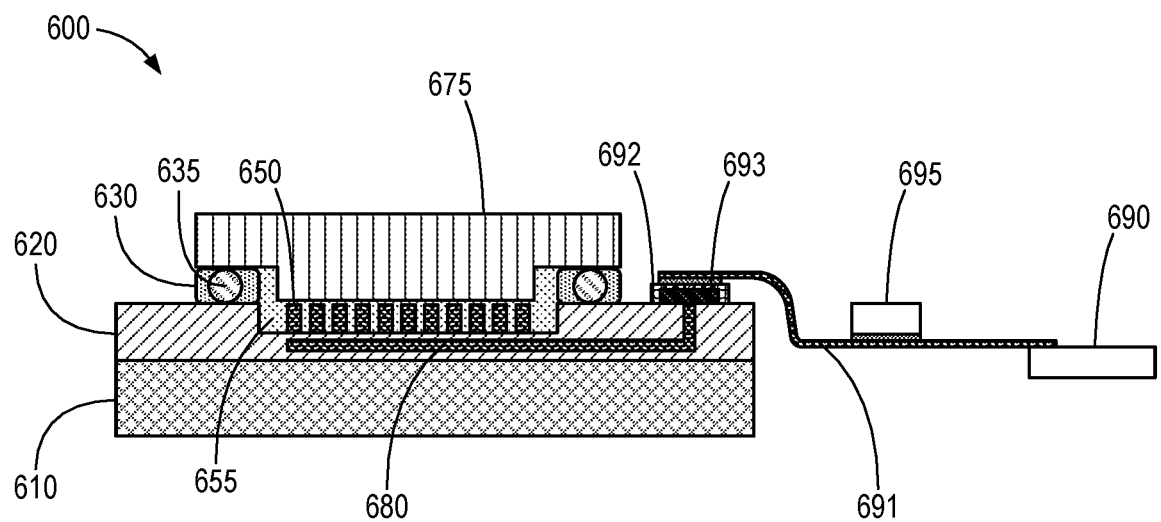
FIG. 6A illustrates a side-cutaway view of the layers of a tunable optical device, according to one embodiment.

FIG. 6A illustrates a side-cutaway view of the layers of a tunable optical device 600, according to one embodiment. As illustrated, the tunable optical device 600 includes a substrate 610 upon which a dielectric layer 620 is formed. A cavity 655 is etched or otherwise formed in the dielectric layer 620. In the illustrated example, the cavity 655 is filled with liquid crystal or another liquid dielectric material with a tunable refractive index, such as an electro-optic polymer, a chalcogenide glass, and/or a semiconductor material.

Optical structures 650 are illustrated within the cavity 655 and may be embodied as, for example, elongated rails for one-dimensional beam steering or an array of pillars for two-dimensional beamforming. The optical structures 650 and the liquid crystal in the cavity 655 are elements of a metasurface positioned within the cavity 655 of the tunable optical device 600. The metasurface may further include a reflective layer beneath the optical structures 650 (not shown in the figures to avoid obscuring the drawings), such as a metal reflective layer (e.g., an aluminum or copper layer) or a Bragg reflector comprising multiple dielectric layers with varying indices of refraction. Additionally, in embodiments in which the reflective layer is conductive and the optical structures 650 are conductive (e.g., metal rails or pillars), the metasurface may further include an insulating layer between the optical structures 650 and the reflective layer(s).

A glass cover 675 spans the cavity 655 and is sealed to and supported by the rim of the dielectric layer 620 around the perimeter of the cavity 655. In the illustrated embodiment, an epoxy 630 seals the glass cover 675 to the dielectric layer 620 to form the sealed chamber that encompasses the cavity 655 and the optical structures 650. The liquid crystal is trapped or confined within the sealed chamber. A spacer bead 635 maintains a minimum gap between the cover glass 675 and the dielectric layer 620 to prevent the cover glass 675 from over compressing the epoxy 630 (e.g., making it too thin) and/or allowing the lower surface of the cover glass 675 to contact and potentially damage the optical structures 650.

The illustrated cover glass 675 is not a planar layer of glass. Rather, the cover glass includes a protrusion in the form of a rectangular block that extends toward the optical structures 650 to reduce the volume of the sealed chamber. The illustrated tunable optical device 600 includes an anisotropic conductive film 692 over aluminum bonding pads 693. Conductors 680 are embedded within the dielectric layer 620 (e.g., etched and deposited during a CMOS-compatible manufacturing process) to connect a control board 690 and a metasurface driver 695 to the optical structures 650. The control board 690 may, for example, comprise a printed circuit board (PCB).

In some embodiments, as illustrated, a polyimide film 691 is used to connect the control board 690 and the metasurface driver 695 to the bonding pads 693 via the anisotropic conductive film 692. Various packaging technologies, integrated circuit connection types, and conductor routing configurations may be utilized. Examples of technologies that may be employed in packaging a tunable optical device include but are not limited to, polyimide (PI) films, chip on film (CoF), flexible copper-clad laminates (FCCLs), chip on plastic (CoP), chip on glass (CoG), flexible printed circuit boards (FPCBs), copper foils, adhesives, and other related technologies.

In all the figures, the block diagrams are merely for illustrative purposes and are not to scale and are not intended to represent the actual sizes of any of the elements, the relative sizes of various elements, the actual shapes of the elements, or even the quantity of any given element. For example, the dielectric layer 620 may comprise multiple layers of dielectric materials. As another example, while only eleven optical structures 650 are shown across the width of the cavity 655, the cavity 655 may be on the order of tens of millimeters while the optical structures 650 may have widths on the order of tens of nanometers. Thus, the actual number of optical structures 650 may be in the thousands, tens of thousands, hundreds of thousands, or millions. Similarly, while the width of the tunable optical device 600 may be on the order of tens of millimeters, the total thickness of the tunable optical device 600 may only be a few millimeters or less. As a final example to illustrate the limitations of the figures, the glass cover 675 might be millimeters thick (e.g., 0.5 to 3 millimeters thick), while the spacer bead 635 within the epoxy 630 might only be 1 to 10 microns thick. Thus, it will be appreciated by one of skill in the art that the relative sizes, dimensions, shapes, element counts, etc. are exaggerated and distorted to facilitate an understanding and visualization of various elements.

Figure 6B:
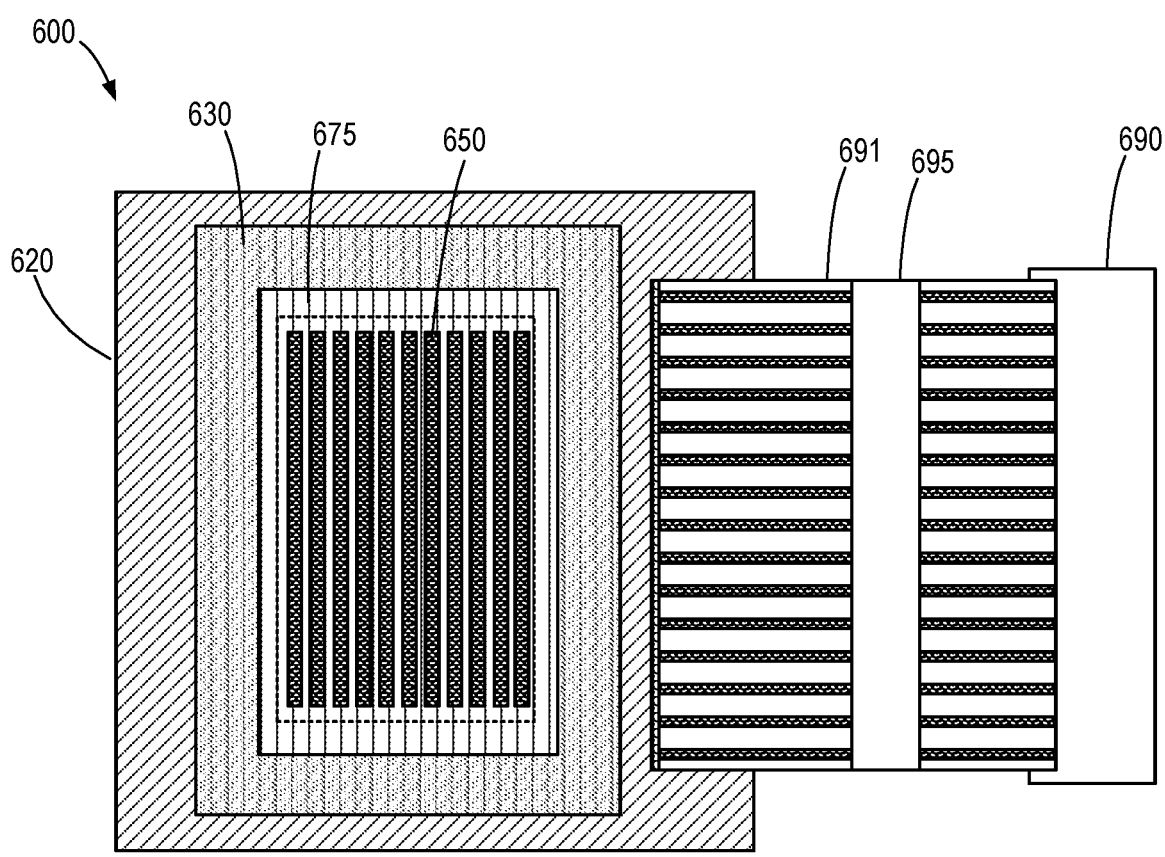
FIG. 6B illustrates a top-down view of the tunable optical device of FIG. 6A, according to one embodiment.

FIG. 6B illustrates a top-down view of the tunable optical device 600 of FIG. 6A. As illustrated, the optical structures 650 (illustrated as elongated rails) are positioned within a rectangular cavity 655 etched (e.g., via chemical etching, plasma etching, ion-beam etching, etc.) in the dielectric layer 620. The optically transparent glass cover 675 allows for the epoxy 630 to be seen around the entire perimeter of the cavity 655 within which the elongated rails are positioned. The top-down view of the tunable optical device 600 provides a more expansive view of the polyimide film 691 connecting the control board 690 and the metasurface driver 695 to the aluminum bonding pads 693 (not visible in FIG. 6B), and from there to the individual optical structures 650 (or tiled sets of optical structures 650, as described in greater detail in the patent applications and publications previously incorporated herein by reference).

Figure 6C:
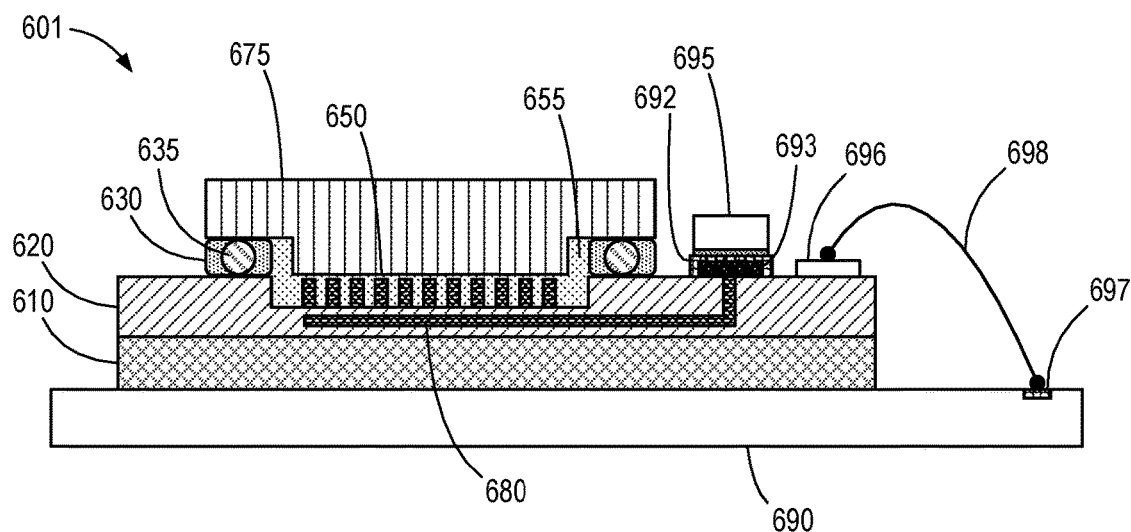
FIG. 6C illustrates a side-cutaway view of the layers of another embodiment of a tunable optical device.

FIG. 6C illustrates a side-cutaway view of the layers of another embodiment of a tunable optical device 601. The illustrated tunable optical device 601 includes a substrate 610 upon which a dielectric layer 620 is formed. A cavity 655 is etched in the dielectric layer 620 and filled with liquid crystal or another liquid dielectric material with a tunable refractive index. The location of the optical structures 650 within the cavity 655 define the optically active area of the tunable optical device 601 and may be embodied as, for example, elongated rails (as shown in FIG. 6B) for one-dimensional beam steering or an array of pillars for two-dimensional beamforming. A glass cover 675 spans the cavity 655 and is sealed to and supported by the rim of the dielectric layer 620 around the perimeter of the cavity 655. In the illustrated embodiment, an epoxy 630 seals the glass cover 675 to the dielectric layer 620 to form the sealed chamber that encompasses the cavity 655 and the optical structures 650. The liquid crystal in the cavity 655 is trapped or confined within the sealed chamber. A spacer bead 635 maintains a minimum gap between the cover glass 675 and the dielectric layer 620 to prevent the cover glass 675 from compressing the epoxy 630 too thin and/or allowing the lower surface of the cover glass 675 to contact and potentially damage the optical structures 650.

In contrast to the tunable optical device 600 of FIG. 6A described above, the tunable optical device 601 includes a metasurface driver 695 as an application-specific integrated circuit (ASIC) chip integrated on top of the anisotropic conductive film 692 on the aluminum bonding pads 693. The illustrated configuration is referred to as a "flipped chip" because the metasurface driver 695 is flipped such that electrical contacts of the metasurface driver 695 can make electrical connections with the aluminum bonding pads 693. A wire bond 698 connects bond pad 696 of the flipped chip metasurface driver 695 to a bond pad 697 of a control board 690. The bond pad 696 may be electrically connected to the metasurface driver 695 externally with respect to the dielectric layer 620 or within the dielectric layer 620. The control board 690 may be, for example, embodied as a PCB upon which the tunable optical device 601 is mounted. The optical structures 650 are connected to the flipped chip metasurface driver 695 and the control board 690 via conductor traces 680 within the dielectric layer 620.

Figure 6D:
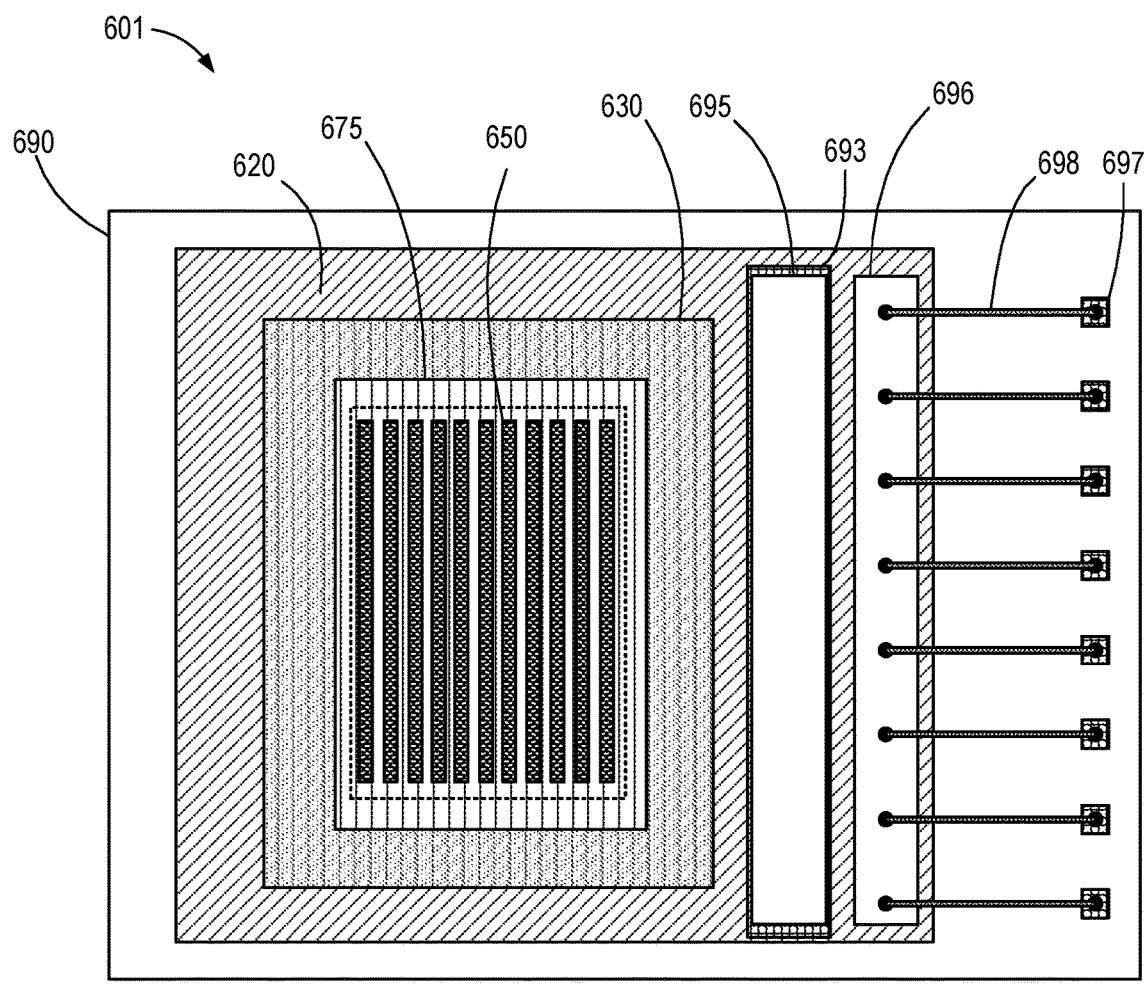
FIG. 6D illustrates a top-down view of the tunable optical device of FIG. 6C, according to one embodiment.

FIG. 6D illustrates a top-down view of the tunable optical device 601 of FIG. 6C. Again, the packaging approach includes the entire tunable optical device 601 mounted on the control board 690. A wire bond 698 connects the bond pad(s) 696 of the flipped chip ASIC metasurface driver 695 to a bond pad 697 of a control board 690 embodied as a PCB, upon which the tunable optical device 601 is mounted.

Figure 6E:
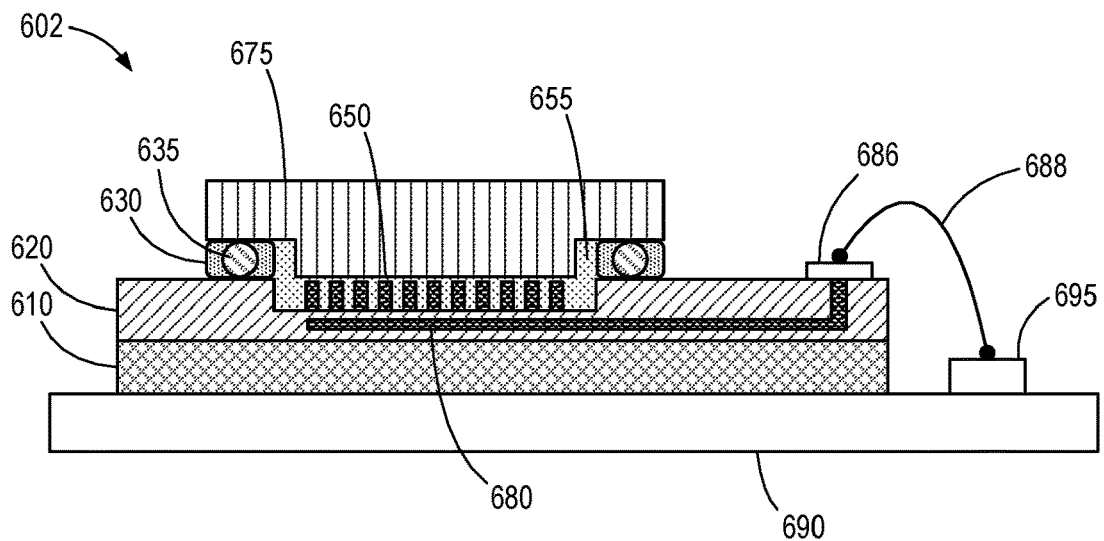
FIG. 6E illustrates a side-cutaway view of the layers of another embodiment of a tunable optical device.

FIG. 6E illustrates a side-cutaway view of the layers of another embodiment of a tunable optical device 602. The illustrated tunable optical device 602 includes a substrate 610 upon which a dielectric layer 620 is formed. A cavity 655 is etched in the dielectric layer 620 and filled with liquid crystal or another liquid dielectric material with a tunable refractive index. The location of optical structures 650 within the cavity 655 define the optically active area of the tunable optical device 602 and may be embodied as, for example, elongated rails (as shown in FIG. 6D) for one-dimensional beam steering or an array of pillars for two-dimensional beamforming.

A glass cover 675 spans the cavity 655 and is sealed to and supported by the rim of the dielectric layer 620 around the perimeter of the cavity 655. In the illustrated embodiment, an epoxy 630 seals the glass cover 675 to the dielectric layer 620 to form the sealed chamber that encompasses the cavity 655 and the optical structures 650. The liquid crystal in the cavity 655 is trapped or confined within the sealed chamber. A spacer bead 635 maintains a minimum gap between the cover glass 675 and the dielectric layer 620 to prevent the cover glass 675 from compressing the epoxy 630 too thin and/or allowing the lower surface of the cover glass 675 to contact and potentially damage the optical structures 650.

In contrast to the tunable optical devices 600 and 601 of FIGS. 6A and 6C, respectively, the tunable optical device 602 includes a metasurface driver 695 mounted on or integrated as part of the control board 690 (e.g., a PCB). In the illustrated embodiment, the wire bond 688 connects bond pad 686, which is connected to the optical structures 650 of the metasurface via conductor traces 680 within the dielectric layer 620. According to various embodiments, a wire bond 688 may include any number of discrete wires or other electrical connections.

Figure 6F:
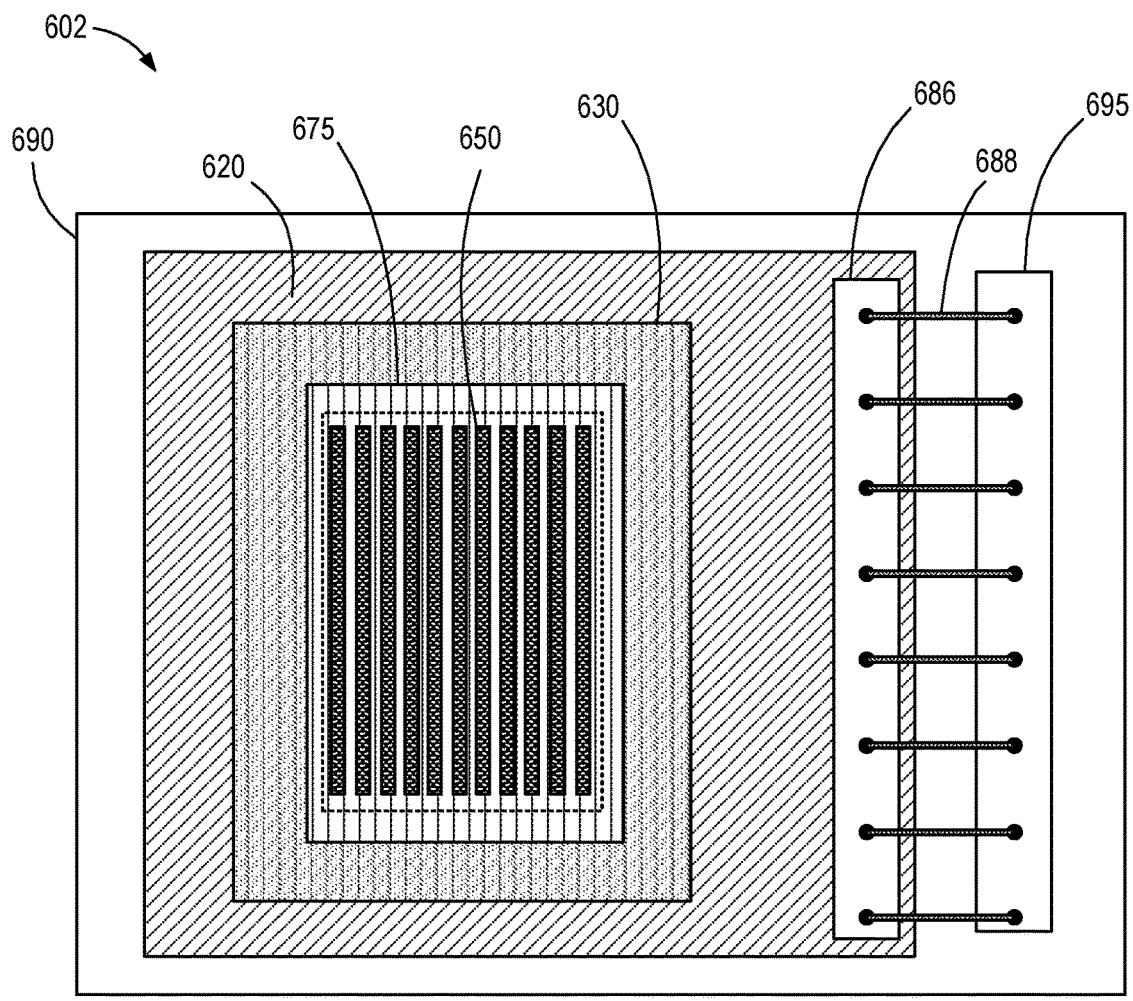
FIG. 6F illustrates a top-down view of the tunable optical device of FIG. 6E, according to one embodiment.

FIG. 6F illustrates a top-down view of the tunable optical device 602 of FIG. 6E. Again, the packaging approach includes the entire tunable optical device 602 mounted on the control board 690. The wire bond 688 connects the bond pads 686 of the tunable optical device 602 to the metasurface driver 695 mounted on the control board 690.

Figure 7A:
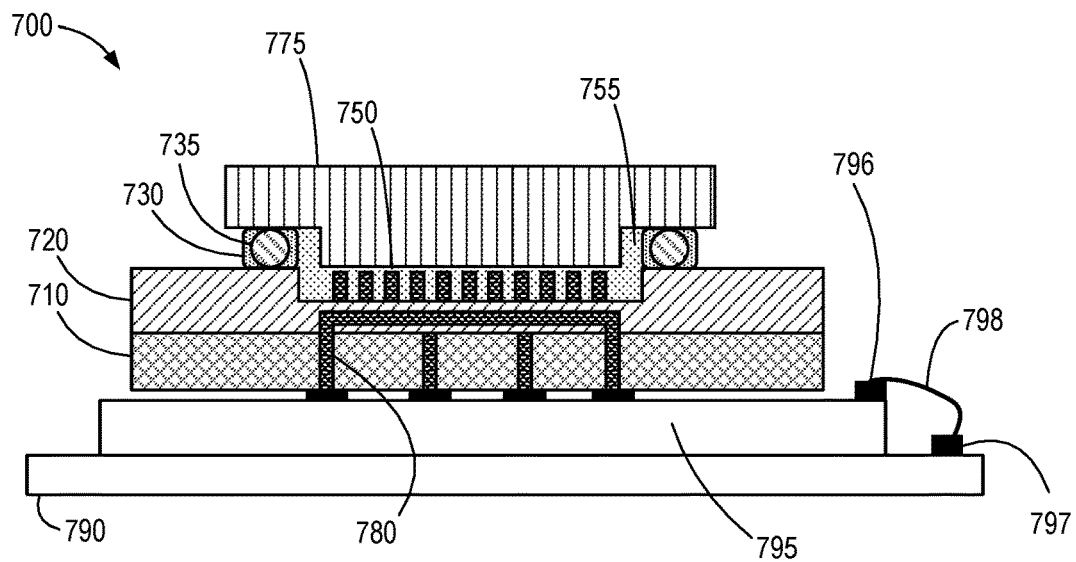
FIG. 7A illustrates a side-cutaway view of the layers of another embodiment of a tunable optical device.

FIG. 7A illustrates a side-cutaway view of the layers of another embodiment of a tunable optical device 700. Again, the illustrated tunable optical device 700 includes a substrate 710 upon which a dielectric layer 720 is formed. A cavity 755 is etched in the dielectric layer 720 and filled with liquid crystal. The location of the optical structures of a metasurface 750 within the cavity 755 define the optically active area of the tunable optical device 700. A glass cover 775 spans the cavity 755 and is sealed to and supported by the rim of the dielectric layer 720 around the perimeter of the cavity 755 via a combination of epoxy 735 and a continuous spacer bead 730. The spacer bead 730 may, in some embodiments, be embodied as a plurality of discontiguous spacer bead segments or spacer blocks around the perimeter of the cavity 755. For example, the spacer bead 730 may be embodied as four spacer blocks to support four corners of the glass cover 775.

The tunable optical device 700 is similar in many aspects to the tunable optical devices 500, 501, 600, 601, and 602 of FIGS. 5A-6F. However, the tunable optical device 700 includes a metasurface driver 795 as an ASIC layer upon which the substrate 710 and other layers of the tunable optical device 700 are positioned. The metasurface driver 795 is connected to the metasurface 750 using through-substrate vias (TSVs) 780. When using a silicon substrate, the TSVs may be referred to as through-silicon vias, which may also be referred to by the same acronym "TSV," understood and distinguishable based on the substrate material utilized in a particular application.

The optical structures of the metasurface 750 are connected to the metasurface driver 795 via conductor traces within the dielectric layer 720. The metasurface driver 795 is positioned on top of and connected to (e.g., mounted on) a control board 790 (e.g., a PCB) via wires 798 and connectors 796 and 797, as illustrated. In alternative embodiments, the metasurface driver 795 may be a surface mount component to be mounted on a PCB control board and/or connected via pins or other electrical connections to the control board 790.

Figure 7B:
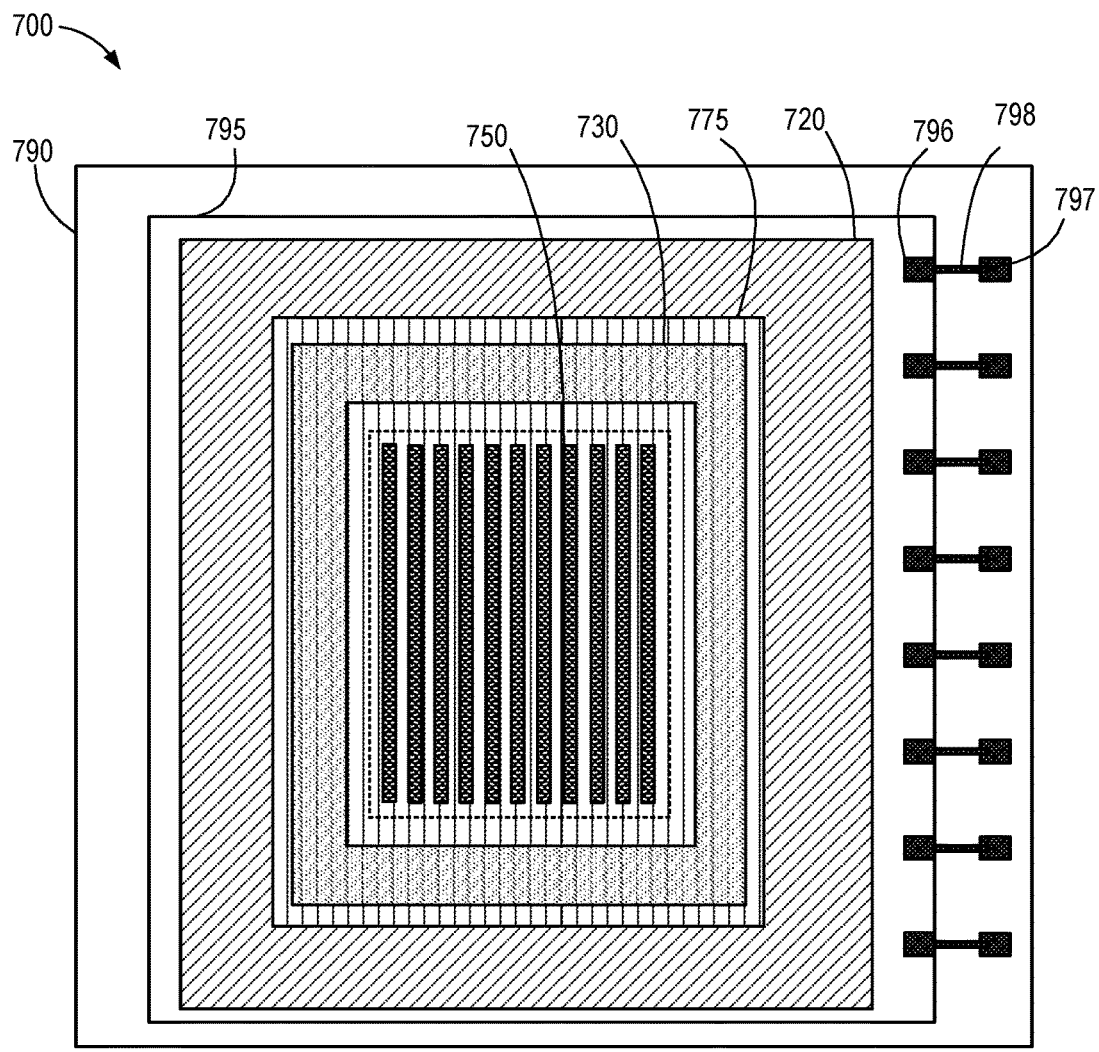
FIG. 7B illustrates a top-down view of the tunable optical device of FIG. 7A, according to one embodiment.

FIG. 7B illustrates a top-down view of the tunable optical device 700 of FIG. 7A. The top-down view illustrates a plurality of wires 798 connecting the connectors 796 of the metasurface driver 795 to the connectors 797 of the control board 790. The optical structures of a metasurface 750 are illustrated as elongated resonant rails. Again, it is appreciated that the metasurface 750 may be embodied as any of a wide variety of alternative metasurfaces having different configurations of one-dimensional or two-dimensional arrays of optical elements and tunable dielectric materials.

Figure 8A:
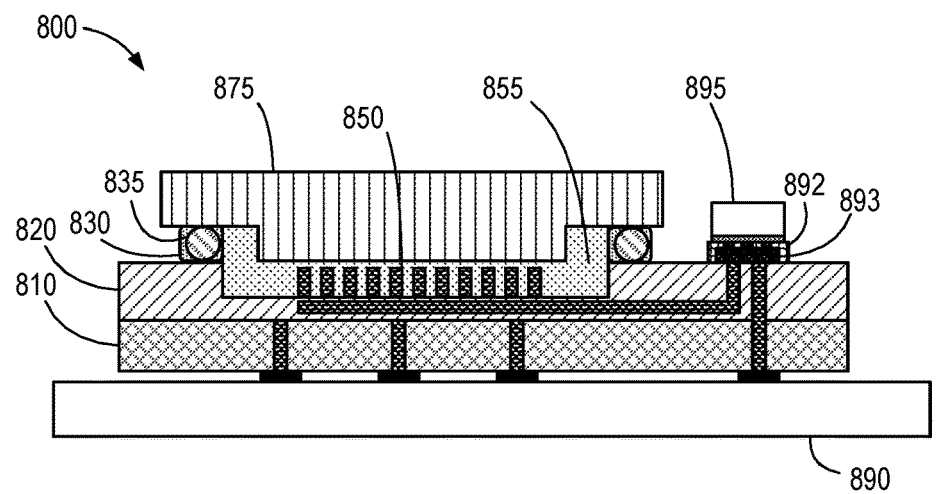
FIG. 8A illustrates a side-cutaway view of the layers of another embodiment of a tunable optical device.

FIG. 8A illustrates a side-cutaway view of the layers of another embodiment of a tunable optical device 800 that includes a metasurface driver 895 in a flipped chip configuration connected to the control board 890 (e.g., a PCB) through vias in the substrate (e.g., using TSVs). In other aspects, the tunable optical device 800 is similar to the embodiment described in conjunction with FIG. 6C. For instance, the tunable optical device 800 includes a substrate 810 upon which a dielectric layer 820 is formed. A cavity 855 is etched in the dielectric layer 820 and filled with liquid crystal or another liquid dielectric material with a tunable refractive index. A metasurface 850 that includes a plurality of optical structures (as illustrated) is positioned within the cavity 855.

An optically transparent cover 875 spans the cavity 855 and is sealed to the dielectric layer 820 around the perimeter of the cavity 855 by an epoxy 830 and spacer bead 835. The cover 875 seals the liquid crystals within the cavity 855 around the optical structures of the metasurface 850. The metasurface driver 895 is integrated on top of an anisotropic conductive film 892 on aluminum bonding pads 893. As noted above, the aluminum bonding pads 893 connect the metasurface driver 895 to the control board 890 via TSVs.

Figure 8B:
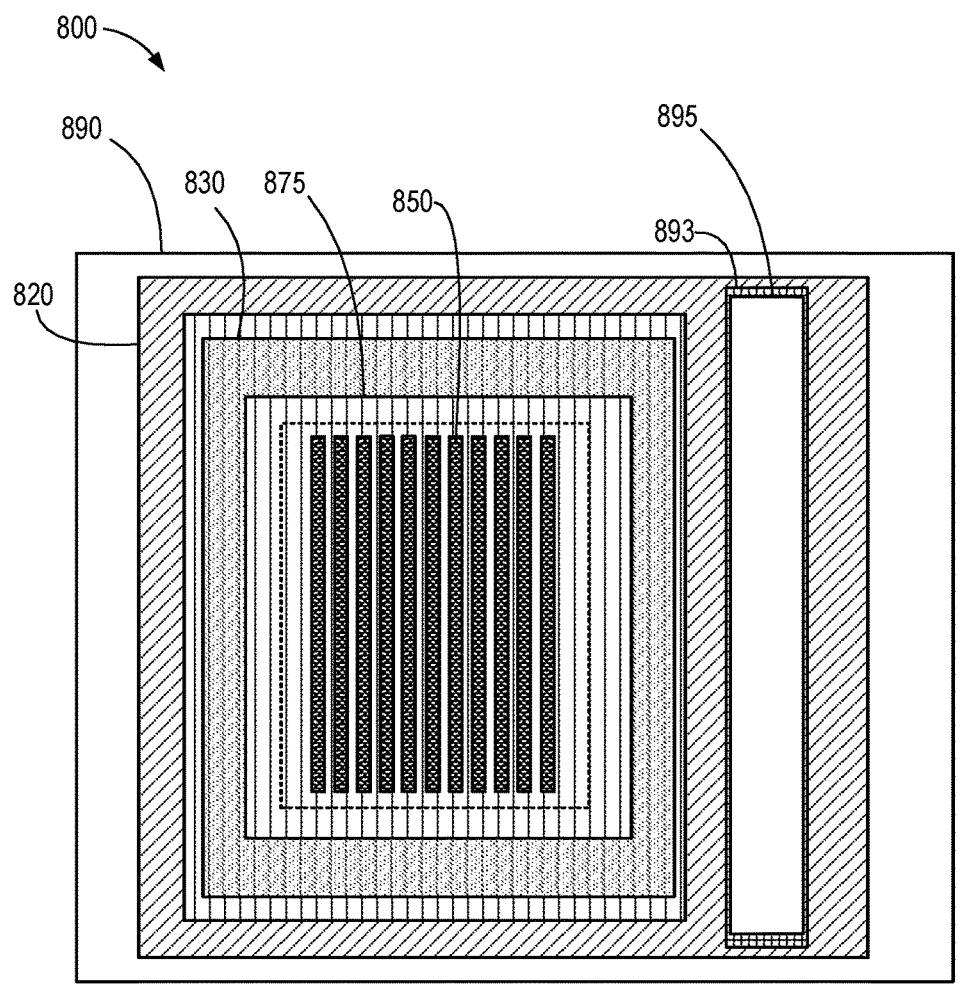
FIG. 8B illustrates a top-down view of the tunable optical device of FIG. 8A, according to one embodiment.

FIG. 8B illustrates a top-down view of the tunable optical device 800 of FIG. 8A. The metasurface 850, the metasurface driver 895, and the control board 890 are connected via TSVs that are not visible. Again, the optical structures of the metasurface 850 are illustrated as elongated resonant rails for one-dimensional beam steering. The metasurface 850 may be modified or replaced with a different metasurface for two-dimensional beam steering and/or a metasurface with a different arrangement of optical structures.

Figure 9A:
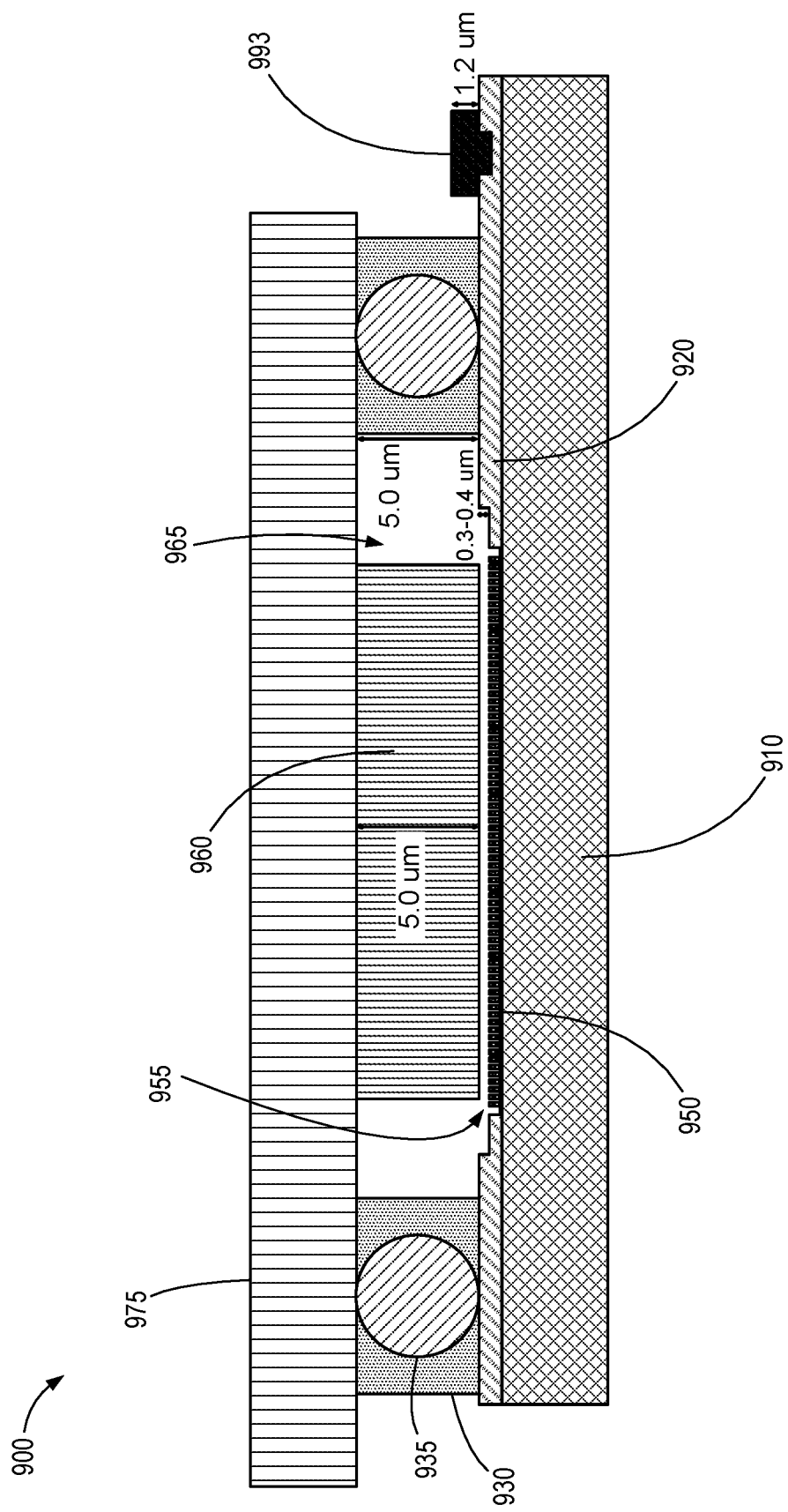
FIG. 9A illustrates a side-cutaway view of the layers of another embodiment of a tunable optical device that includes a patterned photoresist to reduce the volume of the sealed chamber.

FIG. 9A illustrates a side-cutaway view of the layers of another embodiment of a tunable optical device 900 that includes patterned photoresist 960 to reduce the volume of a sealed chamber 965. The specific dimensions illustrated in the figure may be modified and are provided as an example only. The tunable optical device 900 includes a substrate that comprises a base substrate layer 910 and a dielectric substrate layer 920. A cavity 955 is formed in the dielectric layer 920 within which a metasurface 950 is positioned. In the illustrated embodiment, the upper surfaces of optical structures of the metasurface 950 extend upward from the base of the cavity 955 to a height approximately 0.3 or 0.4 microns below the rim of the cavity 955.

A glass cover 975 is spaced approximately 5 microns above the dielectric layer 920 via a spacer bead 935 and sealed thereto via an epoxy 930 to form the sealed chamber 965. The glass cover 975 includes a photoresist 960 patterned on the surface of the glass cover 975 that extends into the sealed chamber 965 to reduce the volume thereof. Liquid crystal or another dielectric material with a tunable refractive index may be injected or otherwise deposited within the sealed chamber 965 around the optical structures of the metasurface 950 (e.g., between and/or above the optical structures of the metasurface 950) within the cavity 955. In the illustrated embodiment, the photoresist 960 extends toward the metasurface 950 but does not contact the upper surface of the metasurface 950. The gap between the photoresist 960 and the metasurface 950 is filled with liquid crystal or another dielectric material with a tunable refractive index.

Similar to other embodiments, bond pads 993 may be formed on the substrate (e.g., on the base layer 910 and/or the dielectric layer 920) to facilitate electrical connections between the metasurface 950 and an external controller, mounted metasurface driver, or another electronic device. Electrical connections, vias, conductor strips, wire traces, or other electrical connections (not shown) in or on the dielectric layer 920 and/or the base layer 910 of the substrate provide connections between the bond pads 993 and the metasurface 950.

Figure 9B:
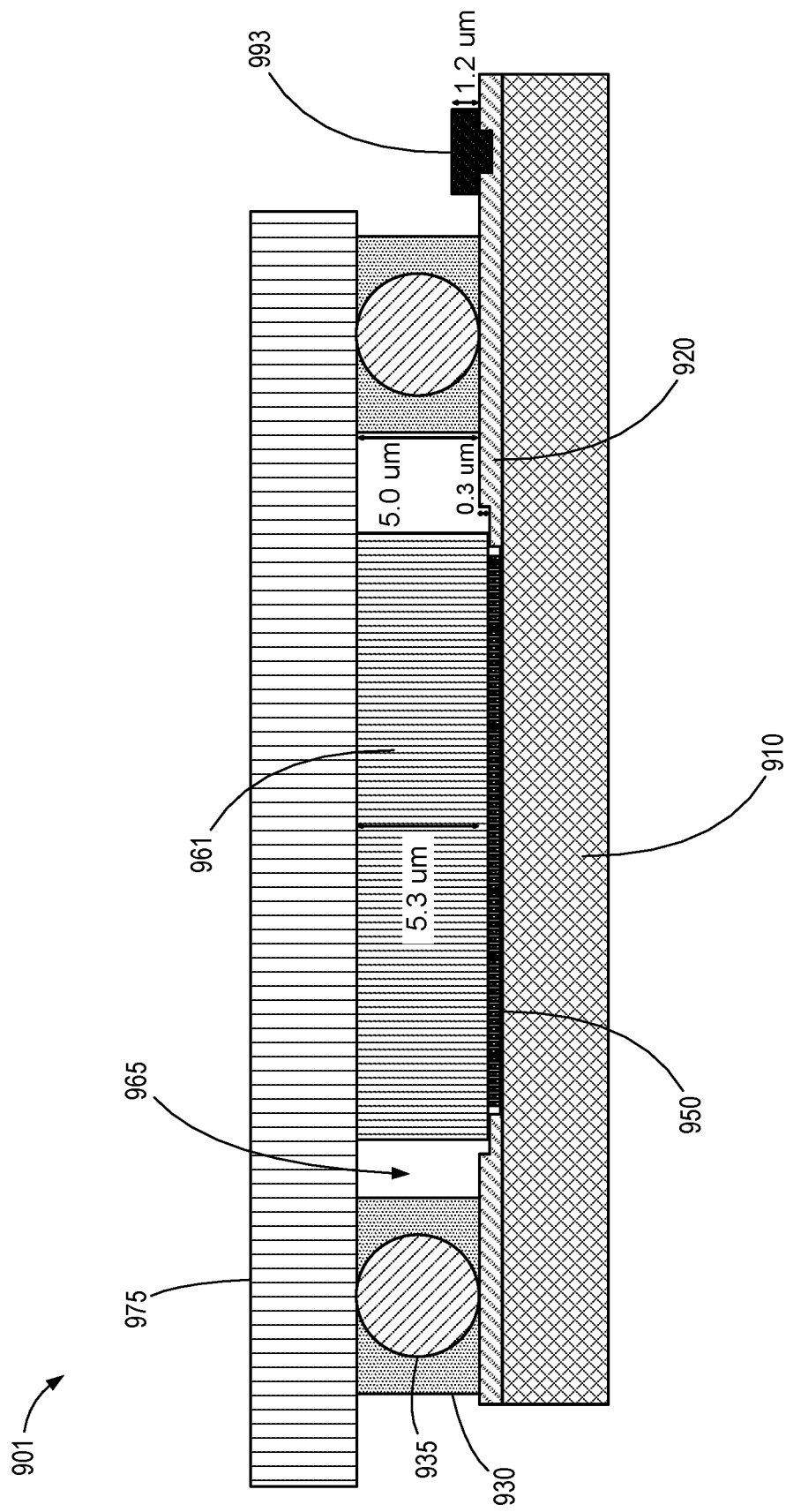
FIG. 9B illustrates a side cutaway view of the layers of another embodiment of a tunable optical device that includes a patterned photoresist to reduce the volume of the sealed chamber that is in direct contact with optical structures of a metasurface.

FIG. 9B illustrates a side cutaway view of the layers of another embodiment of a tunable optical device 901 that is identical to the tunable optical device 900 of FIG. 9A, except that the patterned photoresist 961 contacts an upper surface of the optical structures of the metasurface 950. The other elements of the tunable optical device 901 are the same as those described in conjunction with the tunable optical device 900 of FIG. 9A.

Figure 10:
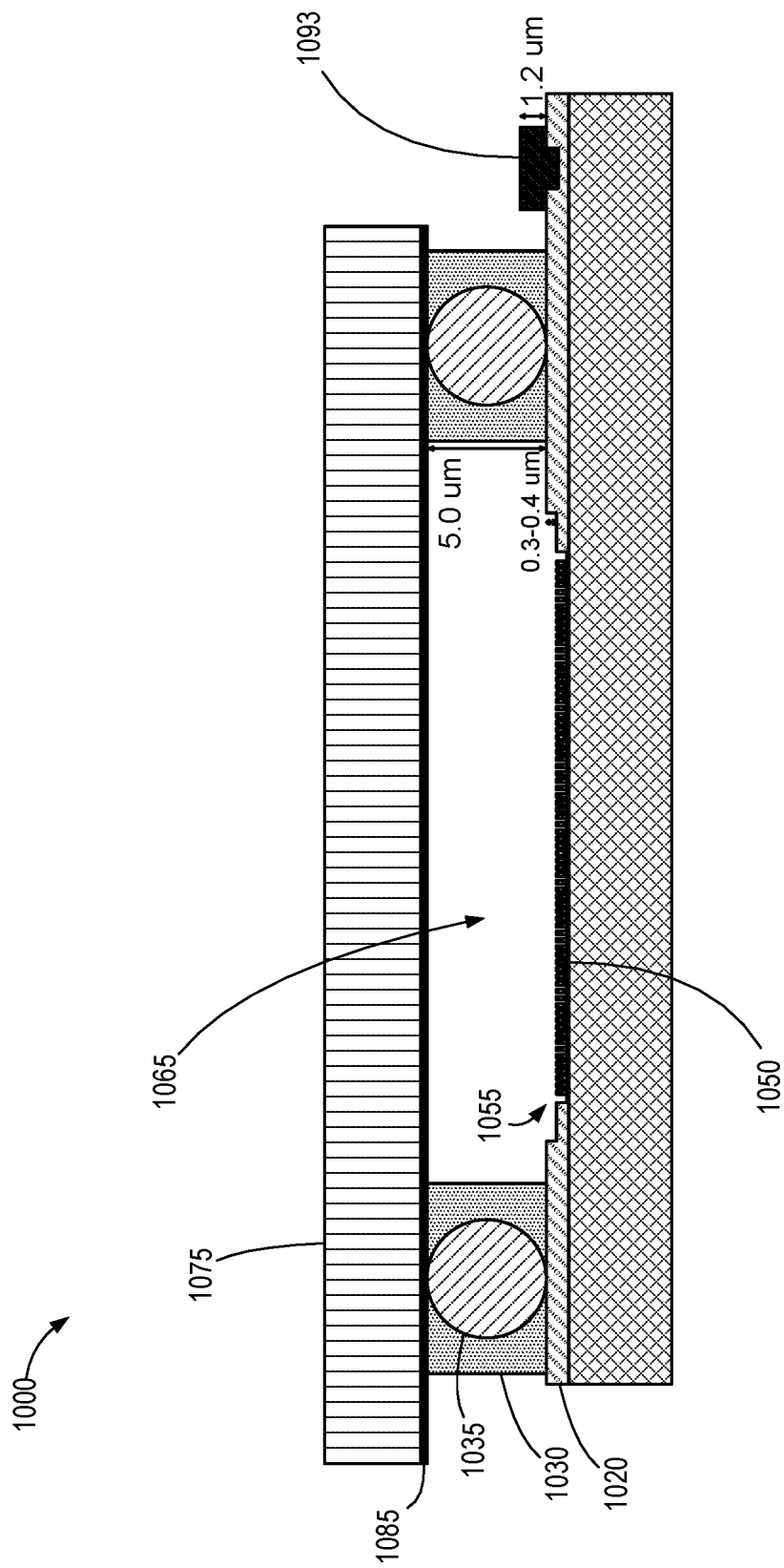
FIG. 10 illustrates a side-cutaway view of the layers of another embodiment of a tunable optical device that includes a transparent electrode layer and a sealed chamber with a relatively large volume.

FIG. 10 illustrates a side-cutaway view of the layers of another embodiment of a tunable optical device 1000 that includes an indium tin oxide (ITO) electrode 1085 within a sealed chamber 1065. As illustrated, the ITO electrode 1085 is formed on a lower surface of an optically transmissive cover 1075 facing into the sealed chamber 1065. In the illustrated embodiment, spacer beads 1035 and epoxy 1030 space the cover 1075 well above a metasurface 1050 such that a volume of the sealed chamber 1065 is relatively large. The sealed chamber 1065 is filled with a tunable dielectric material (e.g., with a tunable refractive index) that is relatively thick. According to various embodiments, the ITO electrode 1085 is energized by a controller or metasurface driver to improve the optical transmission characteristics and/or switching speed of the tunable dielectric material deposited within the sealed chamber 1065.

Similar to other embodiments, the metasurface 1050 is positioned within a cavity 1055 formed in a dielectric layer 1020. Bond pads 1093 are formed on the dielectric layer 1020 to provide external electrical connections to the metasurface 950 via internally routed conductors (not shown). As previously noted, the specific numerical dimensions and sizes illustrated are merely examples and different dimensions and sizes are possible. Moreover, as previously noted, in all the figures, the illustrated components and elements are not to scale and are not intended to represent the actual sizes of any of the elements, the relative sizes of various elements, the actual shapes of the elements, or even the quantity of any given element. In fact, the relative sizes, dimensions, shapes, element counts, etc. are exaggerated and distorted in many instances to facilitate visualization.

Figure 11:
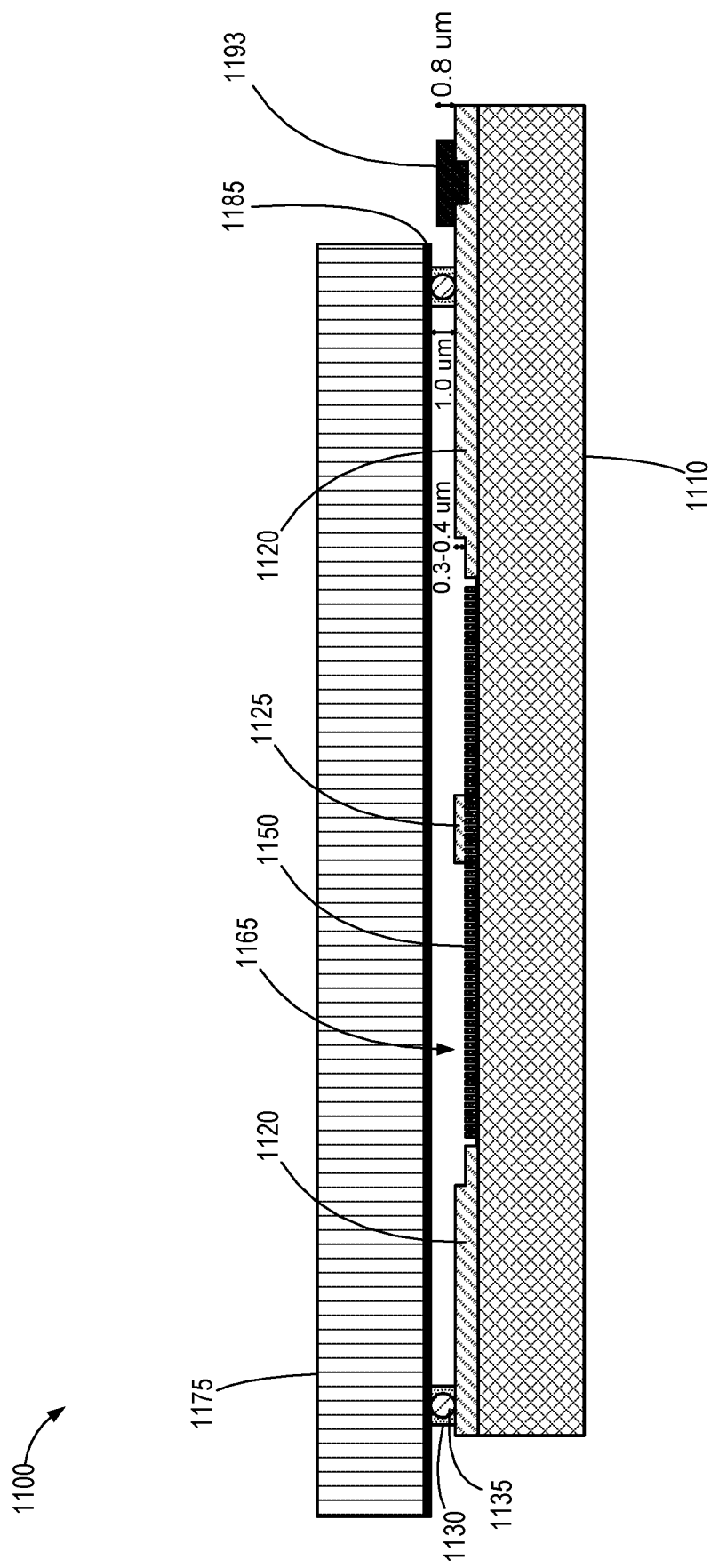
FIG. 11 illustrates a side-cutaway view of the layers of another embodiment of a tunable optical device that includes a transparent electrode layer, a sealed chamber with a relatively small volume, and a mid-array protective spacer.

FIG. 11 illustrates a side-cutaway view of the layers of another embodiment of a tunable optical device 1100 that includes an ITO electrode 1185, a sealed chamber 1165 with a relatively small volume, and a mid-array protective spacer 1125. A substrate 1110 includes a dielectric layer 1120 with a cavity formed therein. A metasurface 1150 comprises an array of optical structures within the cavity that extends upward toward an optically transmissive cover 1175. The sealed chamber 1165 is filled with a tunable dielectric material secured by the cover 1175 sealed to the dielectric layer 1120 by a spacer bead 1135 and epoxy 1130. Bond pads 1193 are formed on the dielectric layer 1120 to provide external electrical connections to the metasurface 1150 via internally routed conductors (not shown).

The mid-array protective spacer 1125 (or an array of mid-array protective spacers) extends from within the array of optical structures of the metasurface 1150 to a height greater than that of the optical structures of the metasurface 1150. The mid-array protective spacer 1125 prevents the cover 1175 or the ITO electrode 1185 from contacting the metasurface 1150. For example, if the cover 1175 flexes, bows or sags, the mid-array protective spacer 1125 would prevent the cover 1175 or the ITO electrode 1185 from directly contacting and potentially damaging the optical structures of the metasurface 1150.

Figure 12:
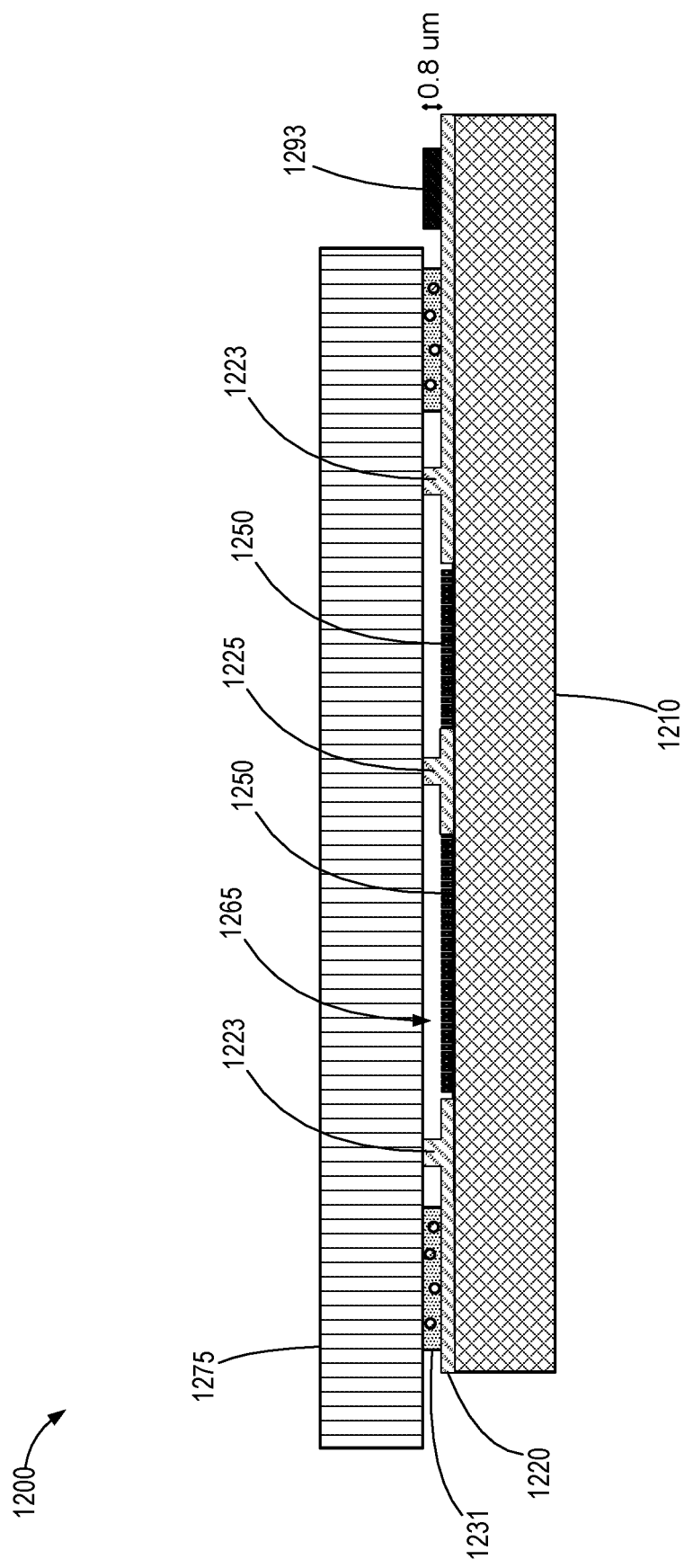
FIG. 12 illustrates a side-cutaway view of the layers of another embodiment of a tunable optical device that includes a sealed chamber with a relatively small volume with dielectric rim support spacers and dielectric mid-array support spacers.

FIG. 12 illustrates a side-cutaway view of the layers of another embodiment of a tunable optical device 1200 that includes a sealed chamber 1265 with a relatively small volume with dielectric rim support spacers 1223 and dielectric mid-array support spacers 1225. The illustrated embodiment includes an optically transmissive cover 1275 sealed to a dielectric layer 1220 via an epoxy 1231. The tunable optical device 1200 also includes bond pads 1293 on the dielectric layer 1220 to provide external electrical connections to the metasurface 1250 via internally routed conductors (not shown). As in previous embodiments, the sealed chamber 1265 is filled with a tunable dielectric material, such as liquid crystal, that flows around or is deposited around the optical structures of the metasurface.

The dielectric layer 1220 is formed on a base layer of a substrate 1210 and etched to have rim support spacers 1223 and mid-array support spacers that extend upward and contact the cover 1275 to maintain a minimum gap between the cover 1275 and optical structures of the metasurface 1250. The mid-array support spacers 1225 extend from within the active area of the tunable optical device 1200 and may slightly decrease the optical efficiency thereof but provide additional support to the portion of the cover 1275 between the rim support spacers 1223. In some embodiments, the additional support may allow for the use of a thinner cover 1275.

Figure 13:
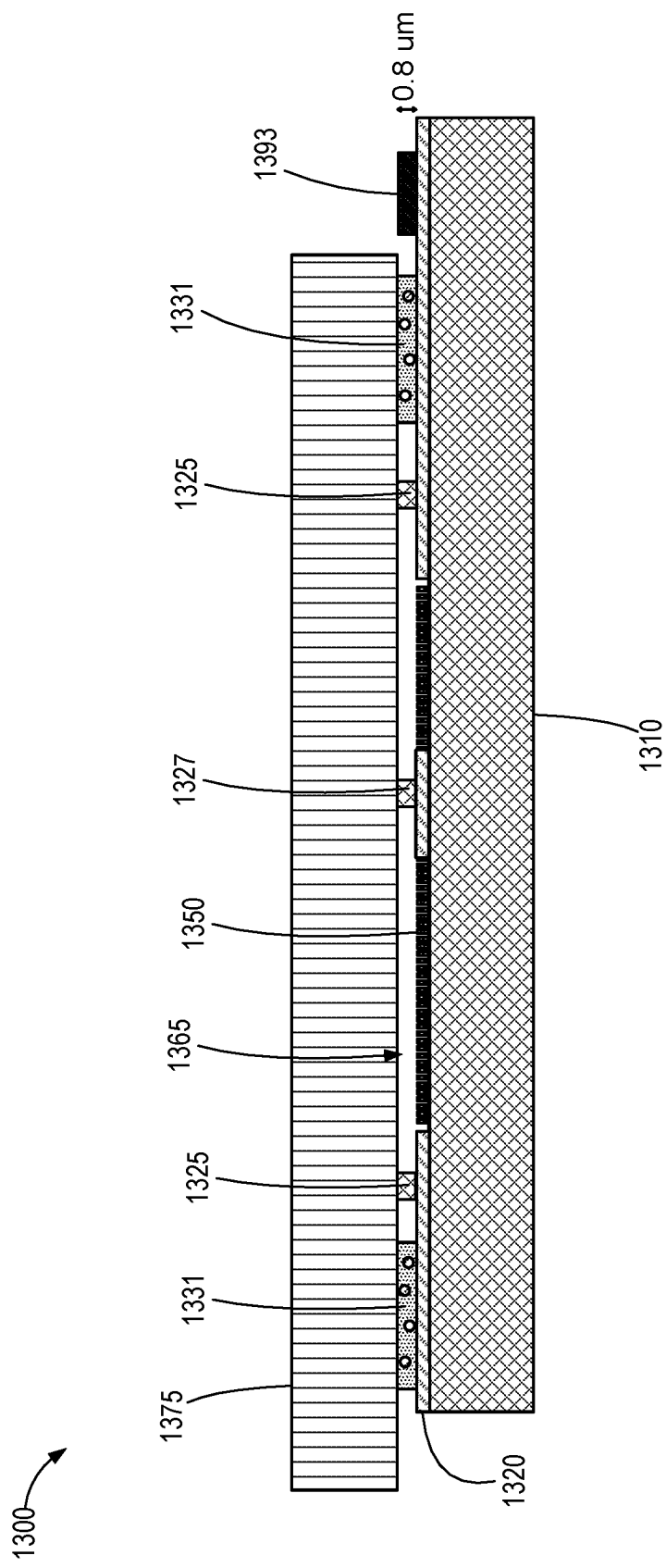
FIG. 13 illustrates a side-cutaway view of the layers of another embodiment of a tunable optical device that includes a sealed chamber with a relatively small volume with metal rim and mid-array support spacers.

FIG. 13 illustrates a side-cutaway view of the layers of another embodiment of a tunable optical device 1300 that includes a sealed chamber 1365 with a relatively small volume with metal rim support spacers 1325 and mid-array support spacers 1327. The tunable optical device 1300 includes an optically transmissive cover 1375 sealed to a dielectric layer 1320 via an epoxy 1331. The tunable optical device 1300 includes bond pads 1393 to provide external electrical connections to the metasurface 1350 via internally routed conductors (not shown). A tunable dielectric material, such as liquid crystal, is positioned within the sealed chamber 1365 and around the optical structures of the metasurface 1350.

The substrate on which the metasurface 1350 is positioned (e.g., placed, formed, deposited, created, or the like) includes the dielectric layer 1320 and a base substrate layer 1310. Rim support spacers 1325 and mid-array support spacers 1327 are positioned on unetched portions of the dielectric layer 1320. Rim support spacers 1325 and mid-array support spacers 1327 may comprise a metal, such as aluminum, silver, gold, or another CMOS-compatible metal. The rim support spacers 1325 and mid-array support spacers 1327 extend upward and contact the cover 1375 to maintain a minimum gap between the cover 1375 and optical structures of the metasurface 1350.

Figure 14A:
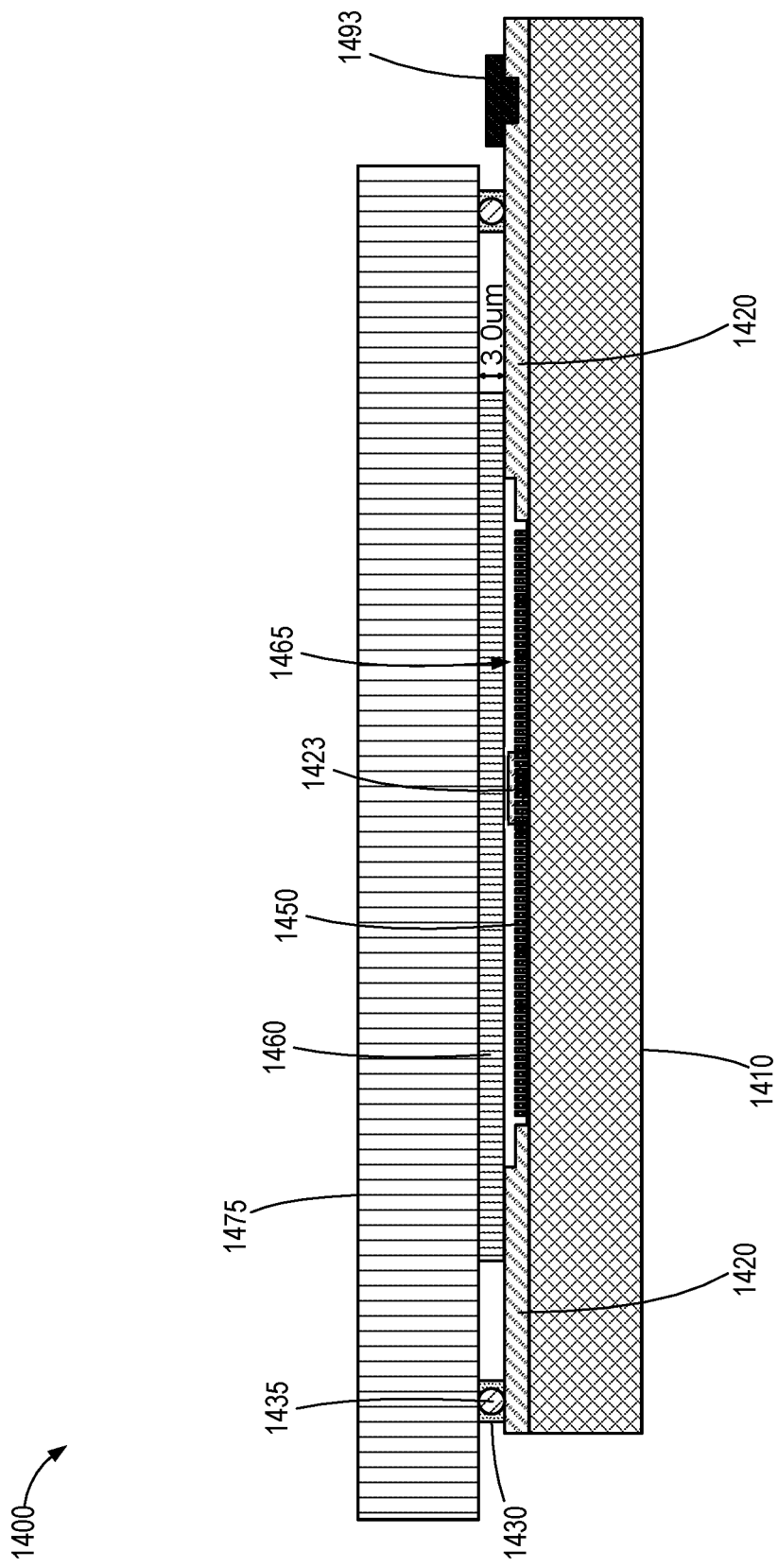
FIG. 14A illustrates a side-cutaway view of the layers of another embodiment of a tunable optical device that includes a cover with a patterned photoresist to reduce the volume of the sealed chamber and mid-array protective spacers.

FIG. 14A illustrates a side-cutaway view of the layers of another embodiment of a tunable optical device 1400 that includes a cover 1475 with patterned photoresist 1460 to reduce the amount or thickness of the liquid crystal necessary to fill a sealed chamber 1465 (e.g., by reducing a volume of the sealed chamber 1465 and mid-array protective spacers 1423. As illustrated, a dielectric layer 1420 is formed on a base substrate layer 1410. A metasurface 1450 is positioned within a cavity etched or otherwise formed in the dielectric layer 1420. The cover 1475 is spaced above the metasurface 1450 and dielectric layer 1420 by a spacer bead 1435 in the epoxy 1430 that seals the cover 1475 to the dielectric layer 1420. Bond pads 1493 provide external electrical connections to the metasurface 1450 via internally routed conductors (not shown).

Liquid crystal, or another tunable dielectric material, is positioned (e.g., deposited or injected) into the sealed chamber 1465 around the optical structures of the metasurface 1450. The volume of the sealed chamber 1465 is significantly reduced by the patterned photoresist 1460 on the cover 1475. In the illustrated embodiment, the photoresist is configured with a thickness corresponding to a thickness of the spacer 1435 such that the photoresist contacts the upper surface of the dielectric layer 1420. However, the photoresist 1460 does not contact the metasurface 1450 or mid-array protective spacers 1423. The mid-array protective spacers 1423 prevent the photoresist 1460 from contacting and potentially damaging components of the metasurface if the cover 1475 is compressed downward, sags, or is otherwise deformed.

Figure 14B:
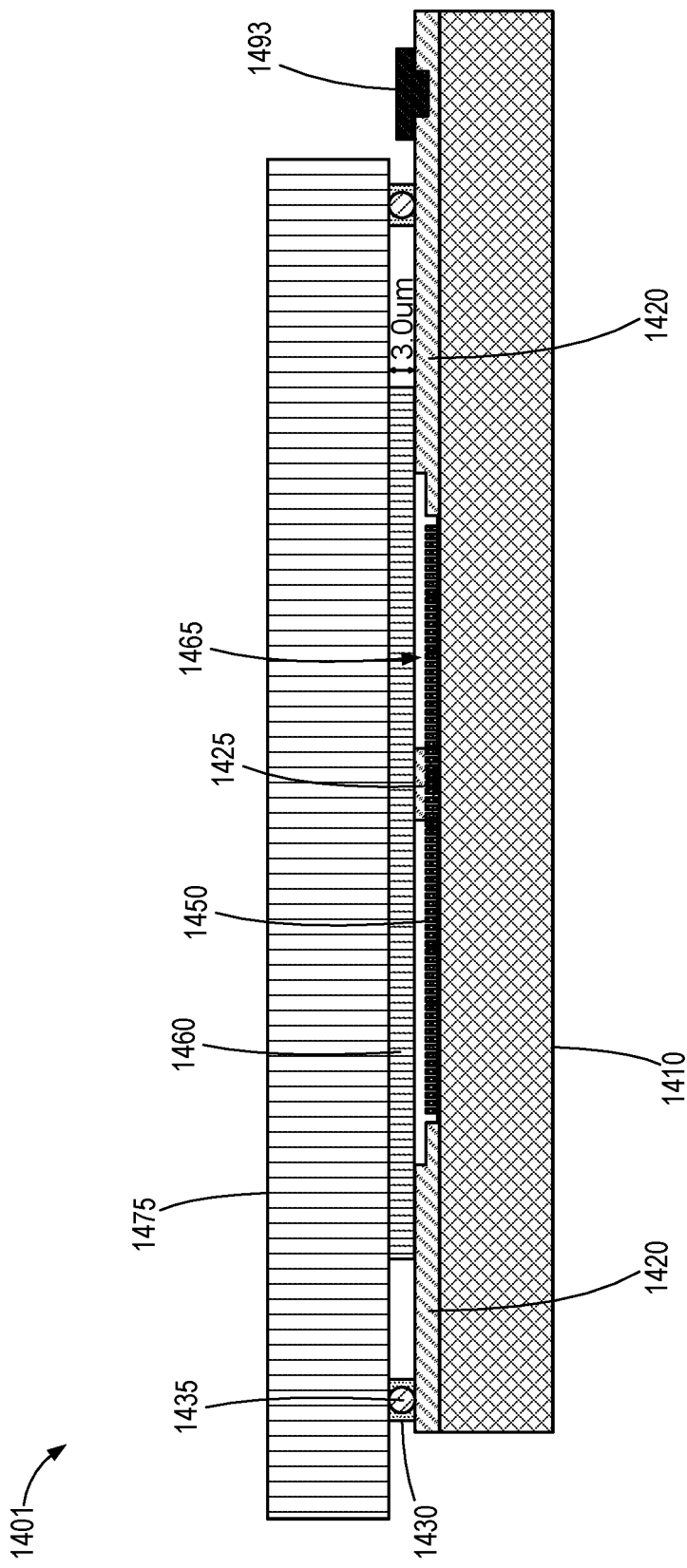
FIG. 14B illustrates a side cutaway view of the layers of another embodiment of a tunable optical device that includes a cover with a patterned photoresist to reduce the volume of the sealed chamber and mid-array support spacers.

FIG. 14B illustrates a side cutaway view of the layers of another embodiment of a tunable optical device 1401 that includes a cover 1475 with patterned photoresist 1460 to reduce the volume of the sealed chamber 1465 and mid-array support spacers 1425. As compared to the tunable optical device 1400 of FIG. 14A, the tunable optical device 1401 includes mid-array support spacers 1425 that extend upward and contact the patterned photoresist 1460 to provide additional support thereto. In other aspects, the tunable optical device 1401 is similar to the tunable optical device 1400 described in conjunction with FIG. 14A.

Figure 14C:
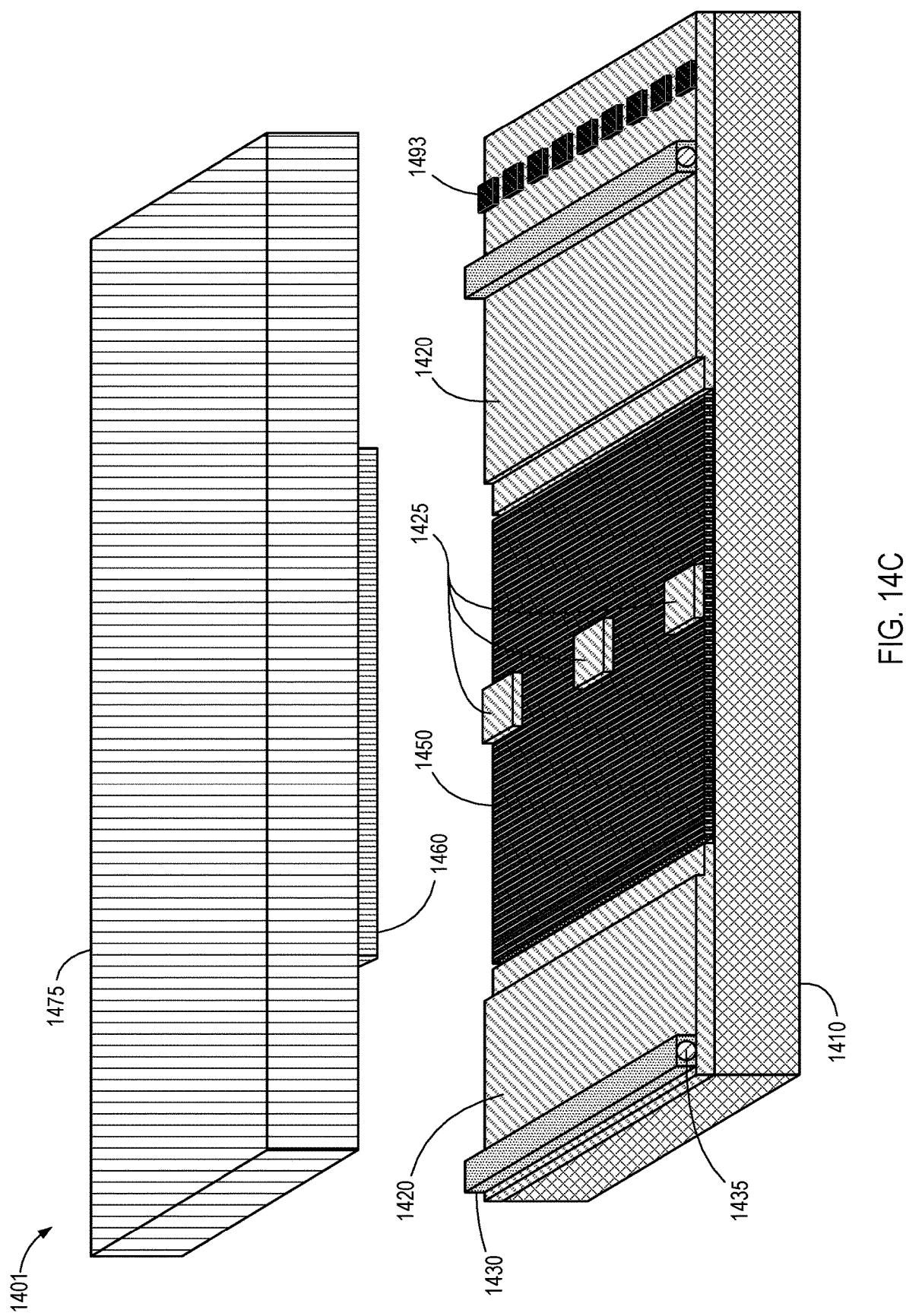
FIG. 14C illustrates a perspective view of a slice of a tunable optical device that includes a cover with a patterned photoresist to reduce the volume of the sealed chamber and mid-array support spacers, according to one embodiment.

FIG. 14C illustrates a perspective view of a slice of tunable optical device 1401 that includes cover 1475 with patterned photoresist 1460 and mid-array support spacers 1425 that extend upward from the base of the cavity in the dielectric layer 1420. The metasurface 1450 is illustrated as an array of rails extending along the length of the cavity formed in the dielectric layer 1420. The spacer bead 1435 extends along the length of both sides of the cavity formed in the dielectric layer 1420. Though not illustrated in the slice of the tunable optical device 1401, the spacer bead 1435 and epoxy 1430 extend along the width of both sides of the cavity formed in the dielectric layer 1420 as well. However, this can be visualized in the top-down views of other embodiments described herein, such as FIG. 8B. The bond pads 1493 provide external electrical connections to the metasurface 1450 via internally routed conductors (not shown).

In some embodiments, a tunable dielectric material is positioned or deposited into the cavity around the metasurface 1450 before the cover 1475 is sealed to the dielectric layer 1420 via the spacer bead 1435 and epoxy 1430. In other embodiments, the cover 1475 is sealed to the dielectric layer 1420 via the spacer bead 1435 and epoxy 1430 to form a sealed chamber. One or more holes may be formed in the sealed chamber (e.g., through the cover 1475) and a tunable dielectric material, such as liquid crystal, is injected into the chamber around the optical structures of the metasurface 1450. After the tunable dielectric material is injected, the holes may be sealed to prevent the tunable dielectric material from escaping or leaking. As previously described, the volume of the sealed chamber is significantly reduced by the patterned photoresist 1460 on the cover 1475. The mid-array support spacers 1425 contact and support the photoresist 1460 above the metasurface 1450.

Figure 15:
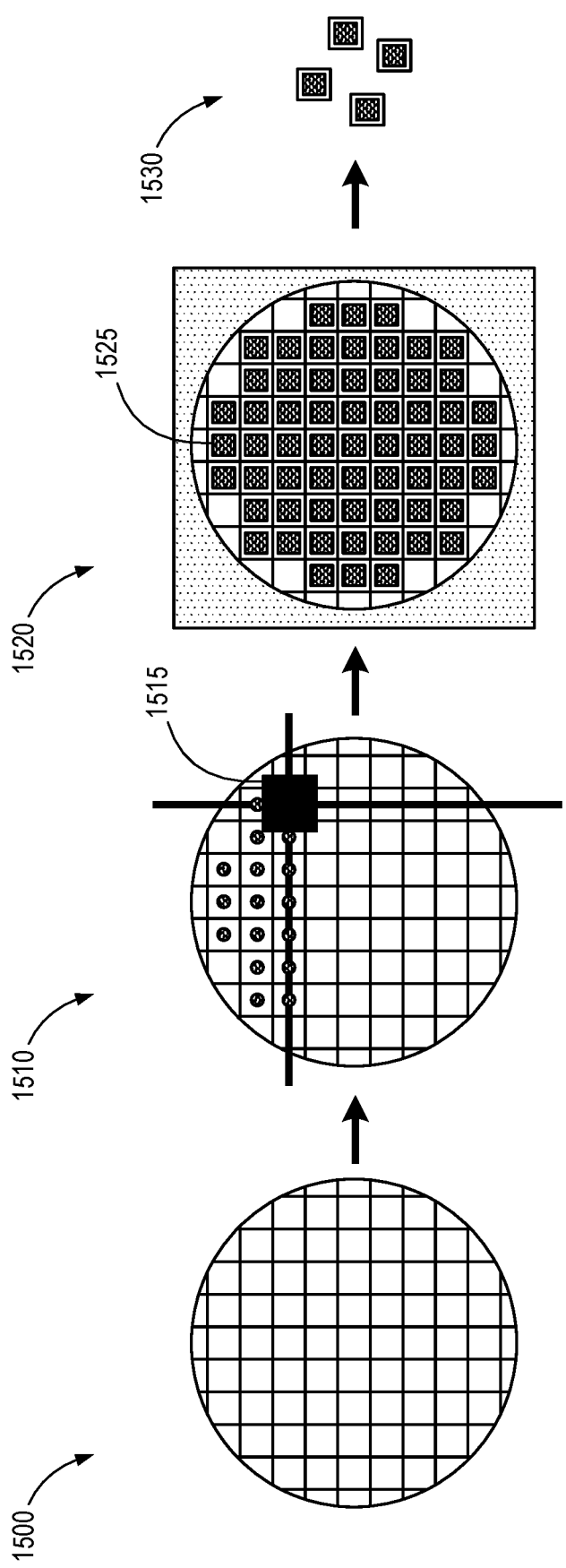
FIG. 15 illustrates a top-down view of a wafer of tunable optical devices with an injector injecting liquid crystal into an open cavity housing a metasurface, according to one embodiment.

FIG. 15 illustrates a top-down view of a wafer of tunable optical devices with an injector 1515 injecting liquid crystal into an open cavity housing a metasurface 1525, according to one embodiment. In the first illustrated stage 1500, tunable optical devices, according to any of the embodiments described herein, are formed on a wafer, each tunable optical device including a metasurface. In the next illustrated stage 1510, the metasurfaces on the wafer are injected with liquid crystal before a cover is secured over the metasurfaces. In the next illustrated stage 1520, the wafer illustrates the cover, such as a glass cover, is positioned onto the wafer to seal the liquid crystal around each of the metasurfaces. In the final illustrated stage 1530, the wafer is separated into individual tunable optical devices, according to any of the various embodiments described herein.

Figure 16:
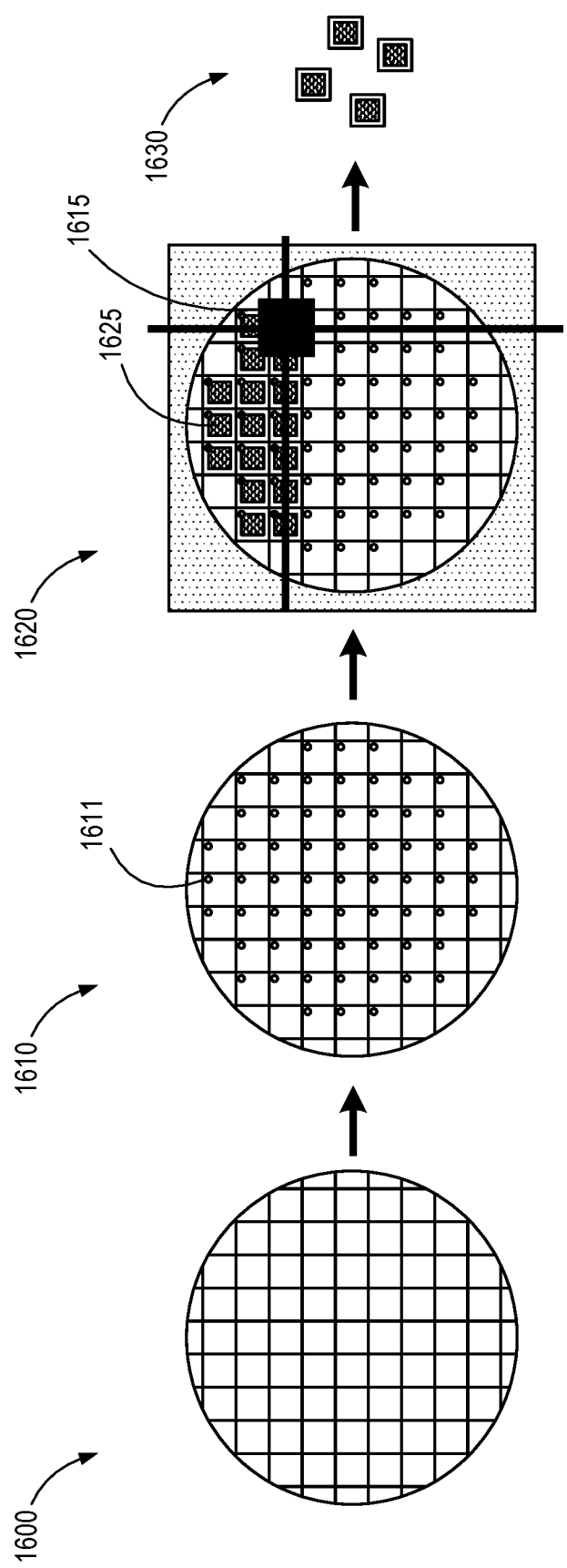
FIG. 16 illustrates a top-down view of a wafer of tunable optical devices with an injector injecting liquid crystal through a fill port in a glass cover into a sealed chamber housing a metasurface, according to one embodiment.

FIG. 16 illustrates a top-down view of a wafer of tunable optical devices with an injector 1615 injecting liquid crystal through a fill port 1611, according to one embodiment. In the first illustrated stage 1600, a glass cover is formed over completed tunable optical devices that each include metasurfaces, according to any of the various embodiments described herein. In the next illustrated stage 1610, fill ports 1611 are drilled, through the glass cover over the tunable optical devices to allow for the injection of liquid crystal into the otherwise sealed chambers that house the individual metasurfaces of each respective tunable optical device. In the next illustrated stage 1620, an injector 1615 injects liquid crystal into the sealed chambers of each tunable optical device, after which the fill ports 1611 are closed to form completed tunable optical devices 1625. In the final illustrated stage 1630, the wafer is separated into individual tunable optical devices, according to any of the various embodiments described herein.

Figure 17A:
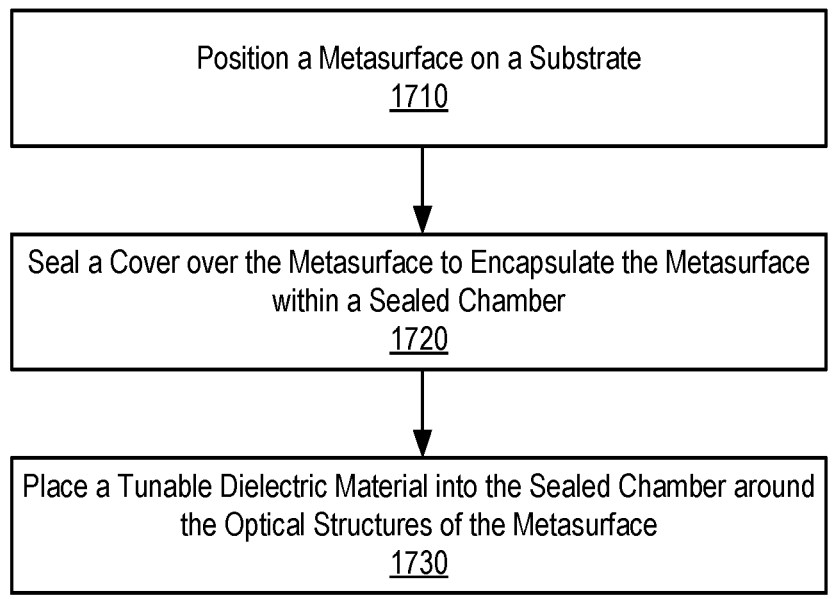
FIG. 17A illustrates an example method to form a tunable optical device, according to one embodiment.

FIG. 17A illustrates an example method to form a tunable optical device, according to one embodiment. As illustrated, a metasurface comprising a plurality of optical structures is positioned, at 1710, on a substrate. In some embodiments, positioning the metasurface on the substrate may include, for example, depositing a reflective layer on a base of an etched cavity, depositing an insulating layer on the reflective layer, and forming an array of optical structures on the insulating layer. In alternative embodiments, a different type or configuration of a metasurface may be positioned on the substrate in a different manner.

An optically transparent cover is sealed, at 1720, over the metasurface to encapsulate the metasurface within a sealed chamber. A tunable dielectric material, such as liquid crystal, that has a tunable refractive index is injected, at 1730, into the sealed chamber around the optical structures of the metasurface. As described herein, the method to manufacture a tunable optical device may include additional processes or operations. For example, an ITO electrode may be deposited on the surface of the cover before the cover is sealed to the substrate. Additionally, or alternatively, a photoresist may be patterned on the surface of the cover before the cover is sealed to the substrate, such that the patterned photoresist extends into the sealed chamber and reduces the volume thereof once the cover is sealed to the substrate.

Figure 17B:
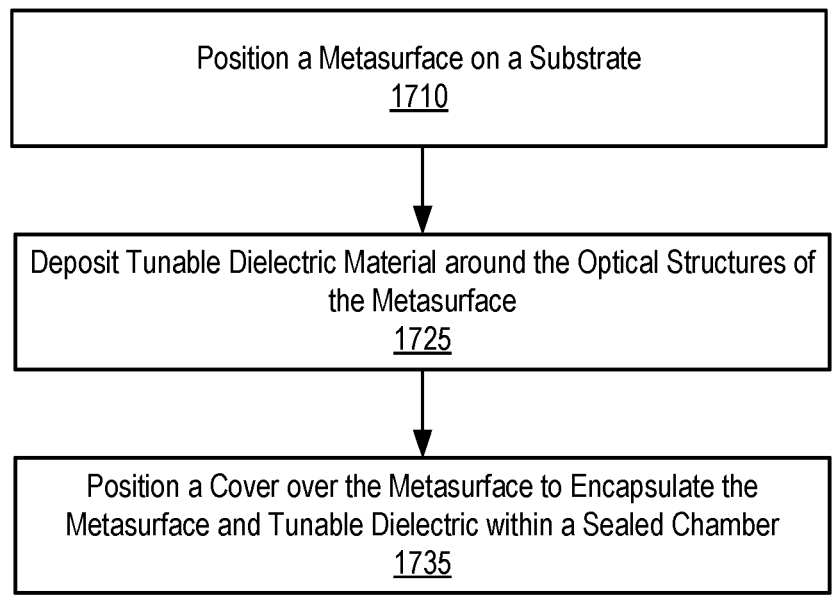
FIG. 17B illustrates another example method to form a tunable optical device, according to one embodiment.

FIG. 17B illustrates another example method to form a tunable optical device, according to one embodiment. Again, a metasurface comprising a plurality of optical structures is positioned, at 1710, on a substrate. A tunable dielectric material is deposited, at 1725, around the optical structures of the metasurface. A cover is then positioned, at 1735, over the metasurface to encapsulate the metasurface and the tunable dielectric material within a sealed chamber.

Figure 18A:
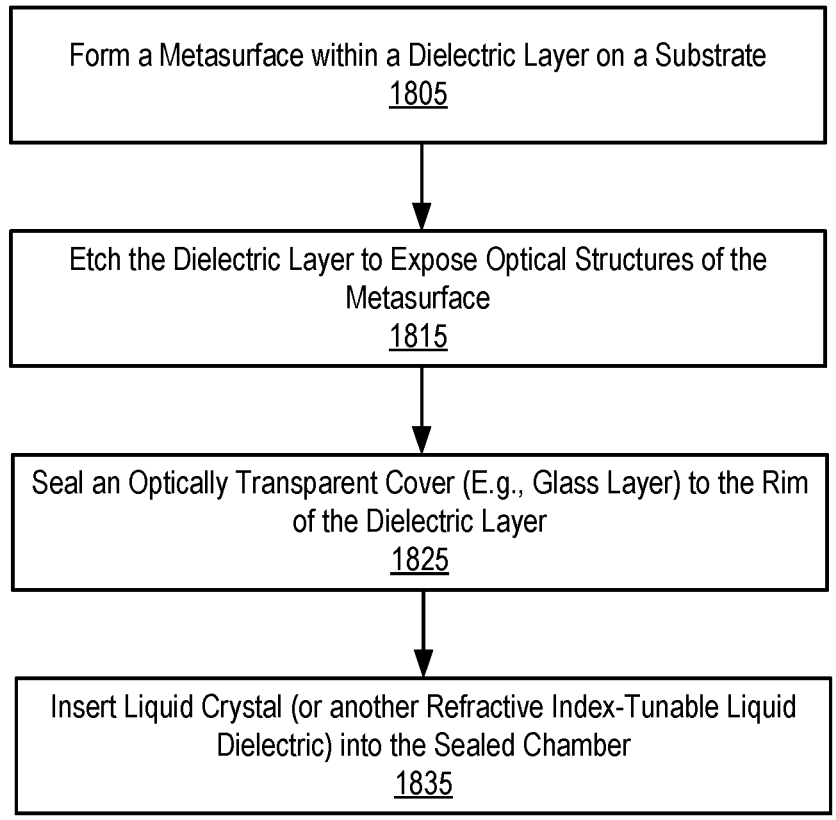
FIG. 18A illustrates another example method to form a tunable optical device, according to one embodiment.

FIG. 18A illustrates another example method to form a tunable optical device, according to one embodiment. As illustrated, a metasurface is formed, at 1805, within a dielectric layer on a substrate. Forming the metasurface within the dielectric layer may include, for example, depositing a reflective layer on a substrate (e.g., copper or another reflective layer as described herein), followed by an insulating layer, and then a dielectric layer. The insulating layer and dielectric layer are described in terms of functionality as separate layers but may be the same layer, same material, different layers, and/or different materials.

Forming the metasurface may then include forming optical structures within the dielectric layer (e.g., via etching and deposition of the optical structure material). The dielectric layer may then be etched, at 1815, to expose the optical structures of the metasurface. An optically transparent cover is sealed, at 1825, to the dielectric layer. Finally, liquid crystal or another tunable dielectric material is inserted, at 1835, into the sealed chamber.

Forming the metasurface in step 1805 may be performed in alternative manners based on the specific type of metasurface used and whether the metasurface is formed on a planar surface of the substrate or within a cavity formed in a dielectric layer of the substrate (or dielectric layer formed on the substrate). For example, in one embodiment, forming the metasurface, at 1805, includes depositing a reflector and an insulator within a cavity formed in a dielectric layer on a substrate. The cavity may then be filled with a dielectric material. Optical structures may then be formed within the dielectric layer.

As described herein, metal bond pads or pillars may optionally be formed on top of the dielectric that is later etched to form the cavity. Similarly, dielectric pillars may be optionally formed above the dielectric that is later etched to form the cavity. According to various embodiments, the cavity dielectric may then be selectively etched to reveal or expose the optical structures within the cavity. The exposed optical structures may then be sealed, at 1825, via a transparent cover and liquid crystal may be inserted therein, at 1835, around the exposed optical structures.

Figure 18B:
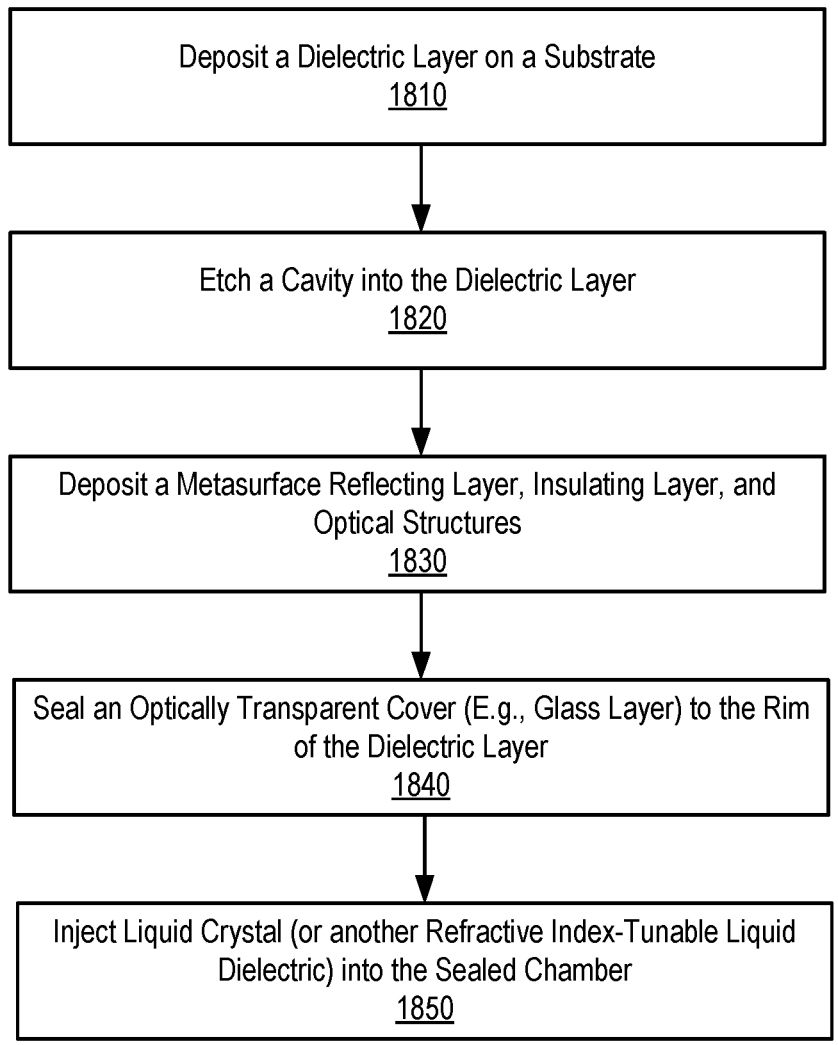
FIG. 18B illustrates another example method to form a tunable optical device, according to one embodiment.

FIG. 18B illustrates another example method to form a tunable optical device, according to one embodiment. As illustrated, a dielectric layer is deposited, at 1810, on a substrate. A cavity is etched, at 1820, into the dielectric layer. A metasurface reflecting layer, an insulating layer, and optical structures are deposited, at 1830, or otherwise formed on the substrate. An optically transparent cover is sealed, at 1840, to the rim of the dielectric layer. Finally, liquid crystal or another tunable dielectric material is injected, at 1850, into the sealed chamber.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be determined to encompass at least the following claims and all possible permutations thereof.

What is claimed is:

1. A tunable optical device, comprising:
   a substrate;
   a metasurface comprising a plurality of optical structures on the substrate;
   an optically transmissive cover sealed to the substrate around a perimeter of the metasurface to encapsulate the metasurface within a sealed chamber;
   a dielectric material with a tunable refractive index within the sealed chamber and around the plurality of optical structures of the metasurface; and
   a plurality of control lines, the plurality of control lines configured to receive a voltage pattern from a driver to cause the metasurface to beam-shape incident optical radiation.

2. The device of claim 1, wherein the dielectric material with the tunable refractive index comprises one or more of: liquid crystal, an electro-optic polymer, a chalcogenide glass, and a semiconductor material.

3. The device of claim 1, further comprising:
   patterned photoresist formed on a surface of the cover that extends from the surface of the cover toward the metasurface to reduce an amount of dielectric material used to fill the chamber.

4. The device of claim 1, wherein the cover comprises a glass cover with a protrusion that extends toward the plurality of optical structures to reduce a volume of the chamber, thereby reducing an amount of dielectric material used to fill the chamber.

5. The device of claim 1, further comprising:
   at least one spacer to support the cover at a spacing distance above the plurality of optical structures of the metasurface,
   wherein the at least one spacer comprises one or more of a dielectric material and a metal.

6. The device of claim 1, further comprising a seal to seal the cover to the substrate, the seal selected from a group of seals that consists of:
   an epoxy seal that seals the cover to the substrate, and
   a spacer bead and epoxy combination seal that seals the cover to the substrate, maintains a minimum epoxy thickness, and spaces the cover from the metasurface.

7. The device of claim 1, further comprising:
   a transparent electrode layer formed on a surface of the cover between the cover and the metasurface.

8. The device of claim 1, wherein the plurality of optical structures of the metasurface comprise at least one of:
   an array of elongated resonator rails arranged parallel to one another with respect to an optical reflector on the substrate; and a two-dimensional array of pillars arranged with sub-wavelength interelement spacings, wherein the array of pillars extends from an optical reflector on the substrate.

9. The device of claim 1, further comprising:
a spacer bead that spaces the cover a minimum distance from the metasurface;
an epoxy that seals the cover to the substrate;
patterned photoresist formed on a surface of the cover that extends from a surface of the cover toward an array of optical structures of the metasurface; and
at least one support member extending from within the array of optical structures of the metasurface toward the patterned photoresist to prevent the cover and patterned photoresist from contacting the metasurface.

10. The device of claim 9, wherein the substrate comprises a dielectric layer with a cavity formed therein,
wherein the metasurface is positioned within the cavity, and
wherein the cover is sealed around a perimeter of the cavity to the dielectric layer of the substrate.

11. The device of claim 10, wherein the cavity is etched into the dielectric layer with a depth between 0.1 and 5 microns, a length between 1 millimeter and 30 millimeters, and a width between 1 millimeter and 30 millimeters,
wherein the dielectric layer has a thickness between 0.1 microns and 5 microns,
wherein the cover is sealed around the perimeter of the cavity with an epoxy and spacer bead that has a thickness between 0.1 micron and 10 microns,
wherein the cover has a thickness between 0.1 millimeter and 3 millimeters, and
wherein the patterned photoresist has a thickness selected to:
(i) place the patterned photoresist in contact with the metasurface, or
(ii) maintain a gap of fewer than 0.5 microns between the patterned photoresist and the metasurface.

12. A tunable optical device, comprising:
a substrate;
a metasurface comprising a plurality of optical structures on the substrate;
an optically transmissive cover sealed to the substrate around a perimeter of the metasurface to encapsulate the metasurface within a sealed chamber;
a dielectric material with a tunable refractive index within the sealed chamber and around the plurality of optical structures of the metasurface; and
a driver to selectively apply a voltage pattern to the plurality of optical structures of the metasurface via a plurality of control lines, the applied voltage pattern operable to cause the metasurface to beam-shape incident optical radiation.

13. The device of claim 12, wherein the control lines are one of:
routed from the driver to the plurality of optical structures through a dielectric layer formed on the substrate, and
routed from the driver to the plurality of optical structures using through substrate vias (TSVs).

14. The device of claim 12, wherein the driver is embodied in a flipped chip configuration mounted in electrical connection with bond pads of the control lines,
wherein the control lines are routed between the bond pads and the plurality of optical structures within a dielectric layer formed on the substrate.

15. The device of claim 12, wherein the driver is connected to the control lines via a polyimide film.

16. The device of claim 12, wherein the driver is mounted on a printed circuit board (PCB), and wherein the metasurface is connected to the control lines via a wire bond of one or more electrical connections.

17. The device of claim 12, wherein the driver is monolithically integrated within the substrate.

18. A tunable optical metasurface device, comprising:
a substrate;
a dielectric layer on the substrate with a cavity etched therein;
a metasurface formed within the cavity comprising:
an array of elongated resonator rails arranged parallel to one another on a first planar surface of an optically transmissive dielectric;
liquid crystal positioned within an optical field region between adjacent resonator rails; and
an optical reflector beneath the resonator rails to reflect optical radiation within an operational bandwidth;
a glass cover sealed around a perimeter of the cavity to encapsulate the metasurface and maintain the liquid crystal within a sealed chamber and between the adjacent resonator rails; and
a driver to selectively apply voltage patterns to the resonator rails to generate corresponding deflection phase patterns for selective beam steering.

19. The tunable optical metasurface device of claim 18, further comprising:
patterned photoresist formed on a portion of a planar surface of the glass cover to extend into the sealed chamber without contacting the resonator rails of the metasurface to reduce a volume of the sealed chamber.

20. A method to manufacture a tunable optical device, comprising:
positioning a metasurface on a substrate, wherein the metasurface comprises a plurality of optical structures;
sealing an optically transparent cover over the metasurface to encapsulate the metasurface within a sealed chamber;
injecting a tunable dielectric material that has a tunable refractive index into the sealed chamber around the optical structures of the metasurface; and
forming a plurality of control lines to connect a driver to the plurality of optical structures of the metasurface, wherein the driver is configured to selectively apply a voltage pattern to the plurality of optical structures of the metasurface via the plurality of control lines.

21. The method of claim 20, further comprising:
depositing a transparent electrode layer on a surface of the cover within the sealed chamber between the cover and the metasurface.

22. The method of claim 20, further comprising:
patterning photoresist on a surface of the cover positioned to extend into the sealed chamber, effective to reduce a volume of the sealed chamber.

23. The method of claim 20, further comprising:
depositing a dielectric layer on a substrate; and
etching a cavity into the dielectric layer with a target depth, target width, and target length,
wherein the metasurface is positioned on the substrate within the etched cavity.

24. The method of claim 23, wherein positioning the metasurface within the etched cavity comprises:
depositing a reflector on a base of the etched cavity;
depositing an insulating layer on the reflector;
depositing a dielectric layer within the etched cavity;

forming an array of optical structures on the insulating layer within the dielectric layer within the etched cavity; and etching the dielectric layer within the etched cavity to expose the optical structures.

25. The method of claim 24, further comprising:

depositing an epoxy around a perimeter of the etched cavity that seals the cover over the etched cavity and the exposed optical structures of the metasurface within the etched cavity.

26. The method of claim 24, further comprising:

depositing a plurality of support spacers on the dielectric layer within the etched cavity within which the optical structures are formed, wherein etching the dielectric layer within the etched cavity to expose the optical structures includes leaving the support spacers unetched, such that the support spacers extend from the base of the etched cavity to a height at least as great as that of the optical structures of the metasurface to prevent the cover from damaging the optical structures of the metasurface.

27. The method of claim 24, wherein forming the plurality of control lines comprises:

etching paths in the dielectric layer for routing a conductive material between the metasurface and exposed bonding pads for connecting the driver;

depositing the conductive material within the etched paths to form the control lines as integrated control lines;

depositing an exposed bonding pad for each integrated control line, wherein each exposed bonding pad is connected to a first end of each corresponding integrated control line; and connecting a second end of each integrated control line to at least one of the optical structures of the metasurface.

28. The method of claim 27, further comprising:

connecting the driver to the exposed bonding pads, wherein the driver is configured to control the metasurface for selective beam shaping of optical radiation incident through the cover onto the metasurface.

29. The method of claim 28, wherein connecting the driver to the metasurface comprises one of the following:

(i) mounting the driver in a flipped chip configuration on bonding pads of the metasurface;

(ii) mounting the driver to a control board and connecting the driver to bonding pads of the metasurface via a wire bond;

(iii) connecting the driver to bonding pads of the metasurface via a conductive film;

(iv) connecting the driver that is monolithically integrated within the substrate; and (vii) connecting the driver to the metasurface using through substrate vias (TSVs).

* * * * *